(12) United States Patent
Cimino et al.

(10) Patent No.: US 12,223,787 B2
(45) Date of Patent: Feb. 11, 2025

(54) METHODS AND APPARATUS FOR VALIDATING WIRELESS ACCESS CARD AUTHENTICITY AND PROXIMITY

(71) Applicant: STMicroelectronics S.r.l., Agrate Brianza (IT)

(72) Inventors: Carlo Cimino, Naples (IT); Luca Di Cosmo, Naples (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 18/138,608

(22) Filed: Apr. 24, 2023

(65) Prior Publication Data
US 2023/0260347 A1 Aug. 17, 2023

Related U.S. Application Data

(63) Continuation of application No. 17/198,612, filed on Mar. 11, 2021, now Pat. No. 11,676,434.

(51) Int. Cl.
*G07C 9/22* (2020.01)
*G06F 21/35* (2013.01)
(Continued)

(52) U.S. Cl.
CPC .............. *G07C 9/22* (2020.01); *G06F 21/35* (2013.01); *G07C 9/00174* (2013.01);
(Continued)

(58) Field of Classification Search
CPC .. G07C 9/22; G07C 9/00174; G07C 9/00309; G07C 2009/00341; G07C 2009/00769;
(Continued)

(56) References Cited

U.S. PATENT DOCUMENTS 10,521,984 B1 * 12/2019 Johansson ............. H04L 63/108
11,210,877 B1    12/2021 Amadi et al.
(Continued)

FOREIGN PATENT DOCUMENTS

CA    3122954 A1 * 11/2014 ............. H04L 43/16
CN    110024005 A    7/2019
(Continued)

OTHER PUBLICATIONS

Choi, et al., "Sound-Proximity: 2-Factor Authentication against Relay Attack on Passive Keyless Entry and Start System," Journal of Advanced Transportation, vol. 2018, Jan. 2018, 14 pages.
(Continued)

*Primary Examiner* — Tuyen K Vo
(74) *Attorney, Agent, or Firm* — Slater Matsil, LLP

(57) ABSTRACT

A method includes performing, by a terminal with an access card, a first relay attack check for the access card in accordance with a local value associated with the terminal and a local value associated with the access card; determining, by the terminal, that the access card has passed the first relay attack check, and based thereon, performing, by the terminal with the access card, an authentication check of the access card in accordance with the local value associated with the terminal, the local value associated with the access card, and a local challenge value associated with the terminal; and determining, by the terminal, that the access card has passed the first relay attack check and the authentication check, and based thereon, validating, by the terminal, the access card.

20 Claims, 12 Drawing Sheets

(51) Int. Cl.
 *G07C 9/00* (2020.01)
 *H04W 4/80* (2018.01)

(52) U.S. Cl.
 CPC .. *G07C 9/00309* (2013.01); *G06F 2221/2103* (2013.01); *G06F 2221/2111* (2013.01); *G07C 2009/00341* (2013.01); *G07C 2009/00769* (2013.01); *H04W 4/80* (2018.02)

(58) Field of Classification Search
 CPC ...... G07C 2009/00555; G07C 2209/63; G06F 21/35; G06F 2221/2103; G06F 2221/2111; H04W 4/80; H04W 12/06; H04W 12/106; H04W 12/61; H04W 12/63; H04W 4/40; B60R 25/24; B60R 2325/103; H04L 9/3249; H04L 9/3252
 See application file for complete search history.

(56) References Cited

U.S. PATENT DOCUMENTS

| | | | |
|---|---|---|---|
| 2013/0116964 A1 | 5/2013 | van Roermund et al. | |
| 2015/0082427 A1* | 3/2015 | Ivanchykhin | G06Q 20/4015 726/22 |
| 2016/0191236 A1 | 6/2016 | Smirnoff et al. | |
| 2016/0352605 A1* | 12/2016 | O'Donoghue | H04L 9/0838 |
| 2018/0232971 A1 | 8/2018 | Schieke | |
| 2019/0044951 A1 | 2/2019 | Zivkovic et al. | |
| 2019/0373475 A1* | 12/2019 | Top | H04W 12/037 |
| 2020/0052905 A1 | 2/2020 | Mathias | |
| 2020/0128401 A1 | 4/2020 | Shin et al. | |
| 2020/0334357 A1 | 10/2020 | Patne | |

FOREIGN PATENT DOCUMENTS

| | | | |
|---|---|---|---|
| CN | 110291754 A | 9/2019 | |
| WO | WO-2014195501 A3 * | 3/2015 | ........... G06Q 20/102 |
| WO | 2018127407 A1 | 7/2018 | |
| WO | WO-2018169522 A1 * | 9/2018 | ........... G06Q 20/352 |

OTHER PUBLICATIONS

Hoelscher, Penny, "What is a Relay attack (with examples) and How Do They Work?," https://wwww.comparitech.com/blog/information-security/what-is-relay-attack/#, Jan. 18, 2021, 12 pages.

Kim, et al., "Vehicle Relay Attack Avoidance Methods Using RF Signal Strength," Scientific Research, Communication and network, Apr. 2013, pp. 573-577.

Ranganathan, et al., "Are We Really Close? Verifying Proximity in Wireless Systems," IEEE Security and Privacy, vol. 15, Issue 3, Jun. 9, 2017, 10 pages.

* cited by examiner

METHODS AND APPARATUS FOR VALIDATING WIRELESS ACCESS CARD AUTHENTICITY AND PROXIMITY

CROSS-REFERENCE TO RELATED APPLICATIONS

This application is a continuation of U.S. application Ser. No. 17/198,612, filed on Mar. 11, 2021, which application is hereby incorporated by reference herein in its entirety.

TECHNICAL FIELD

The present invention relates generally to methods and apparatus for validating wireless access card authenticity and proximity.

BACKGROUND

Wireless smart key systems are increasingly popular due to the convenience afforded by these systems. In general, wireless smart key systems allow users to enter and start an automobile without using a mechanical key. The wireless smart key system includes an access card (often included in a key fob) that undergoes a wireless authentication process before allowing the user to enter and start the automobile.

FIG. 1 illustrates a prior art diagram 100 of a wireless module 105 of an automobile 107 with a wireless smart key system. As shown in FIG. 1, a user 110 with an access card 115 approaches an automobile 107. Automobile 107 includes wireless module 105, which supports communication between automobile 107 and access card 115. As user 110 approaches automobile 107 (and wireless module 105), access card 115 and wireless module 105 commence communications. The communications may occur using a wireless access technology, such as near field communications (NFC), for example. Access card 115 and wireless module 105 participate in the wireless authentication process, and if the wireless authentication process is successful, user 110 is granted access to automobile 107. With access granted, user 110 may open the doors of automobile 107, as well as start automobile 107 and drive away.

Although the wireless authentication process helps to secure the wireless smart key system, attackers with signal relaying devices have been able to enter and start automobiles by relaying signals between the automobile and the access card. Therefore, there is a need for methods and apparatus for validating wireless access card authenticity and proximity, where validating a wireless access card involves confirming that the wireless access card is authentic and that it is within a specified distance away from the automobile (i.e., the wireless access card and the automobile are in close proximity).

SUMMARY

In accordance with an embodiment, a method implemented by a terminal is provided. The method comprising: performing, by the terminal and an access card, a first proximity check for the access card, the first proximity check sharing a local value associated with the terminal and a remote value associated with the access card; determining, by the terminal, that the access card has passed the first proximity check, and based thereon, performing, by the terminal with the access card, an authentication check of the access card in accordance with the local value associated with the terminal, the remote value associated with the access card, and a local challenge value associated with the terminal; and determining, by the terminal, that the access card has passed the first proximity check and the authentication check, and based thereon, validating, by the terminal, an authenticity and proximity of the access card.

In accordance with an embodiment, a terminal is provided. The terminal comprises: one or more processors; and a non-transitory memory storage comprising instructions that, when executed by the one or more processors, cause the terminal to perform, with an access card, a proximity check for the access card in accordance with a local value associated with the terminal and a local value associated with the access card; determine that the access card has passed the proximity check, and based thereon, perform, with the access card, an authentication check of the access card in accordance with the local value associated with the terminal, the local value associated with the access card, and a local challenge value associated with the terminal; and determine that the access card has passed the proximity check and the authentication check, and based thereon, validate the access card.

In accordance with an embodiment, a method implemented by an access card is provided. The method comprising: performing, by the access card and a terminal, a proximity check for the access card, the proximity check sharing a remote value associated with the terminal and a local value associated with the access card; and performing, by the access card and the terminal, an authentication check of the access card in accordance with the remote value associated with the terminal, the local value associated with the access card, and a remote challenge value associated with the terminal.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

In the ensuing description, one or more specific details are illustrated, aimed at providing an understanding of examples of embodiments. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment. Moreover, particular conformations, structures, or characteristics may be combined in any adequate way in one or more embodiments.

The references used herein are provided merely for convenience and hence do not define the scope of protection or the scope of the embodiments.

As discussed previously, the number of automobiles that are equipped with a wireless smart key system is rapidly increasing due to the convenience afforded by these systems. These systems allow the user with an access card (or a key fob that includes either the access card or a secure element implementing the security features of the access card) to enter and start the automobile without using a mechanical key. To provide a measure of security, a wireless authentication process is used to verify that the access card is authentic before granting access to the automobile. As an example, if the access card is authenticated, the user is able to open the automobile door and start the automobile. However, if the access card is not authenticated, the user is neither able to open the automobile door nor start the automobile.

However, the wireless authentication process is susceptible to attack. Attackers may utilize what is known as a relay attack to obtain illicit access to the automobile. In a relay attack, the wireless communications between the access card and the automobile are relayed over a relay channel. The attacker activates the communication between the access card and the automobile without the user knowing and uses the communications to trick the automobile into granting access to the automobile even if the access card is far from the automobile.

Figure 1:
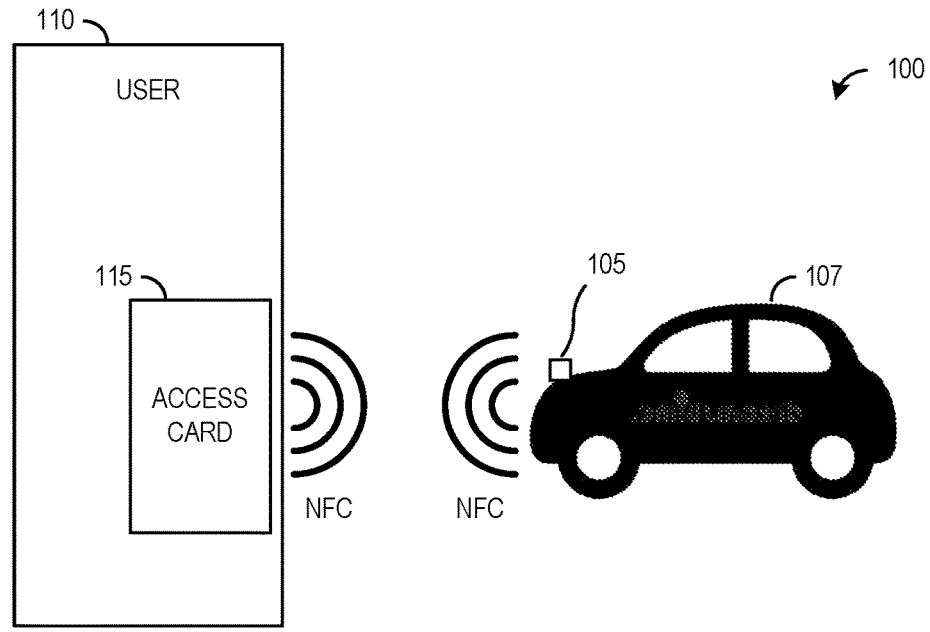
FIG. 1 illustrates a prior art diagram of an automobile with a wireless smart key system.
Figure 2:
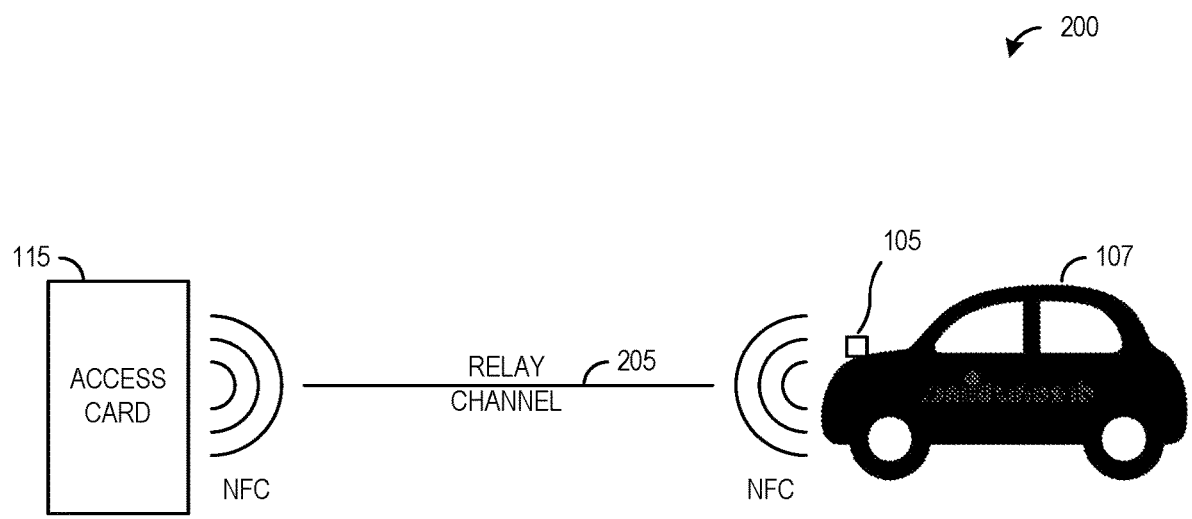
FIG. 2 illustrates a prior art diagram of an automobile with the wireless smart key system highlighting a relay attack.

FIG. 2 illustrates a prior art diagram 200 of wireless module 105 of automobile 107 with the wireless smart key system highlighting a relay attack. In the relay attack, the attacker positions himself in between wireless module 105 and access card 115 and activates the wireless communication between wireless module 105 and access card 115. The wireless communications between wireless module 105 and the attacker, and between the attacker and access card 115 may occur utilizing near field communications (NFC), for example. However, other wireless communications technologies may also be used. The presence of the attacker may be modeled as a relay channel 205, whereas the interaction with the attacker is modeled as a delay associated with relay channel 205.

The attacker, through the relay attack, enlarges the operating distance between wireless module 105 and access card 115, allowing the wireless authentication process to take place when wireless module 105 and access card 115 are far apart, where (due to the large separation) the user is unaware that access has been granted to automobile 107. Whereas a typical wireless authentication process can take place only when access card 115 is within a few feet of wireless module 105, the relay attack may increase the separation between wireless module 105 and access card 115 to several hundred feet when analog techniques are used, or even to continents apart when digital techniques are used. At such a great distance, the user may be totally oblivious to the fact that access to automobile 107 has been granted.

The attacker uses the established wireless communications to trick either wireless module 105 or access card 115 into sending a response that the attacker can use to authenticate access card 115 and obtain access to automobile 107. As an example, the attacker receives the wireless communications from a first device (e.g., either wireless module 105 or access card 115) and without altering the received wireless communications, relays the received wireless communications to a second device (e.g., either access card 115 or wireless module 105).

Figure 3:
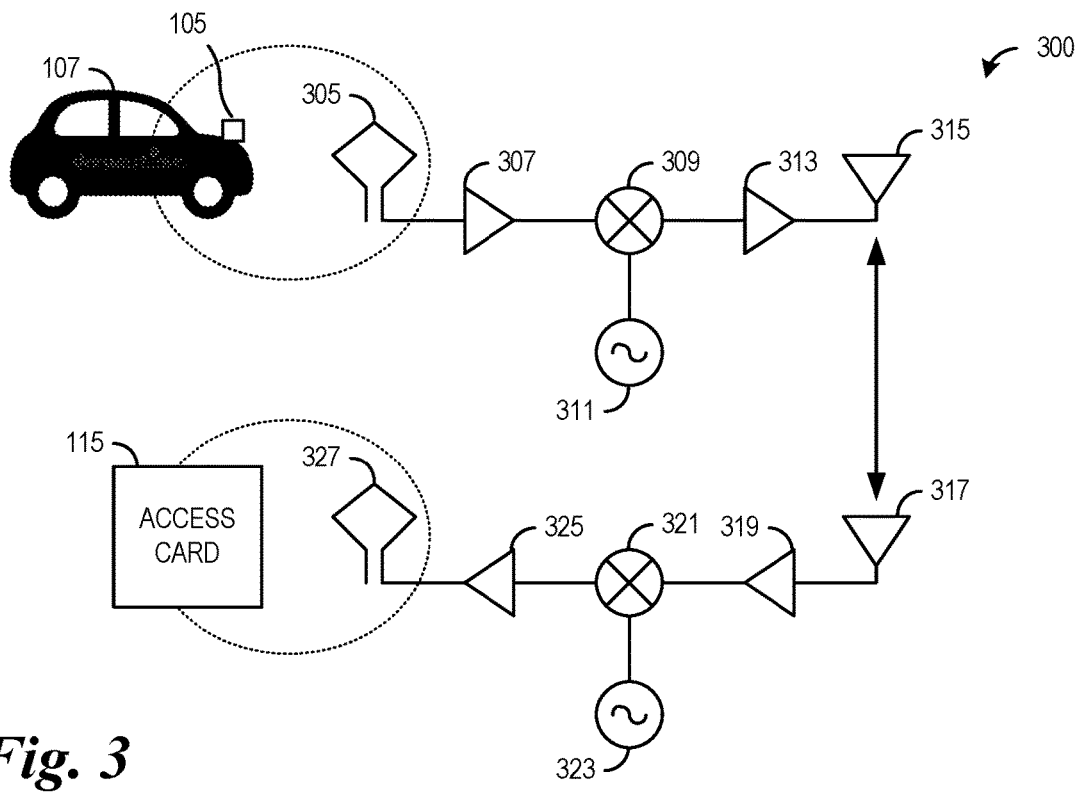
FIG. 3 illustrates a prior art diagram of an analog relay channel attack.

FIG. 3 illustrates a prior art diagram 300 of an analog relay channel attack. In the analog relay attack, the entirety of the wireless communications between wireless module 105 and access card 115 is captured and relayed. Antenna 305, located within an effective communication range of wireless module 105, receives wireless communications from wireless module 105. The received wireless communication is amplified and filtered by amplifier 307, and mixed by mixer 309 to a carrier frequency generated by signal generator 311. Another amplifier 313 amplifies and filters the signal for transmission by antenna 315.

Antenna 317 (which may be located hundreds of feet away from wireless module 105) receives the transmitted signal. The received signal is amplified and filtered by amplifier 319, down mixed by mixer 321 using a carrier frequency generated by signal generator 323, and amplified and filtered by amplifier 325. The output of amplifier 325 is transmitted by antenna 327, which is located within an effective communication range of access card 115, to access card 115.

In the analog relay attack, the entirety of the wireless communication is relayed without modification (other than amplification, filtration, etc.). An advantage of analog relay attacks is the low latency. Because of the low latency, the analog relay attack may be difficult to detect. However, a simple remedy to the analog relay attack is a shielded access card holder to protect access card 115 from unintended wireless communications.

Figure 4:
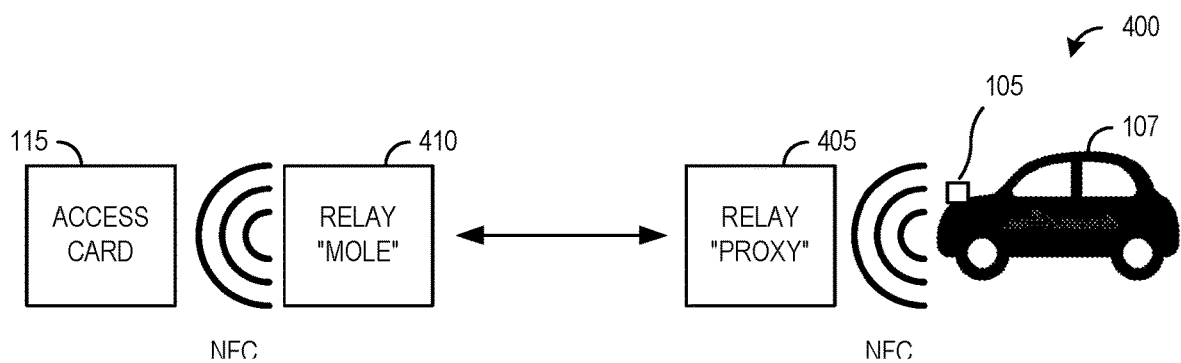
FIG. 4 illustrates a prior art diagram of a digital relay channel attack.

FIG. 4 illustrates a prior art diagram 400 of a digital relay channel attack. In the digital relay channel attack, the wireless communications are not relayed, only the data is relayed. The digital relay channel attack involves a first relay (referred to as a proxy) 405 emulates access card 115 and communicates with wireless module 105, and a second relay (referred to as a mole) 410 emulates wireless module 105 and communicates with access card 115. First relay 405 communicate with second relay 410 (over an extended distance) to exchange the data communicated by wireless module 105 and by access card 115 (which occurs over a near distance when compared to first relay 405 and second relay 410).

The digital relay channel attack may proceed as follows:
First relay 405 (emulating access card 115) communicates with wireless module 105 to initiate the wireless authentication process and receives the wireless communications from wireless module 105. First relay 405 relays the data sent by wireless module 105 to second relay 410.
Second relay 410 (emulating wireless module 105) communicates with access card 115 and provides the data sent by first relay 405 to access card 115. Second relay 410 receives the wireless communications from access card 115 and relays the data sent by access card 115 to first relay 405.
First relay 405 communicates with wireless module 105 and provides the data sent by second relay 410 to wireless module 105.

The receiving and relaying of the data may continue until the wireless authentication process completes and access to automobile 107 is granted for access card 115.

The digital relay attack can introduce delays on the order of hundreds of milliseconds to the wireless communications process, with the delay being mainly dependent upon the separation between the first relay 405 and the second relay 410. Hence digital relay attacks may be relatively easy to detect. As an example, a distance bounding protocol can be added to existing communication transactions to detect the large delays introduced by the digital relay attach techniques.

According to an example embodiment, methods and apparatus for validating the authenticity and proximity of wireless access cards are provided. As used in the present discussion, the validation of the authenticity and the proximity of a wireless access card involves confirming the authenticity of the wireless access card, as well as ensuring that the wireless access card is within a specified distance away from a wireless module (i.e., the wireless access card and the wireless module are in close proximity). The validation of the wireless access card requires that both the authenticity of the wireless access card is confirmed and the proximity of the wireless access card is ensured. If one of the two, either authenticity or proximity, (or both) is not met, the validation of the wireless access card is not achieved. The methods and apparatus validate the wireless access cards by combining distance bounding protocol to ensure proximity with access card authentication. The addition of the distance bounding protocol detects digital relay attacks, which violate proximity, while the access card authentication ensures the authenticity of the access card being authenticated. In an embodiment, the distance bounding protocol is added at the application layer. Adding the distance bounding protocol at the application layer simplifies deployment because modifications to the physical layer of an existing technical standard are generally infeasible.

In an embodiment, the methods and apparatus for validating wireless access cards are based on the following:
An application protocol data unit (APDU) command with a fixed card processing time is added to the authentication transaction, and the wireless module measures the response time of the access card to the APDU command.
The APDU command requests data that only the automobile can generate, so that the APDU command cannot be sent to the wireless access card in advance.
The APDU command returns data that only the wireless access card can generate, so that the response cannot be provided to the wireless module before the wireless access card provides it.
The APDU command is linked with a session identifier (e.g., session ID) to the authentication command, so that the command and response sequence from a previous transaction (which would be linked to a different session identifier) cannot be used. This helps to mitigate replay attacks that exploit old information.

Figure 5:
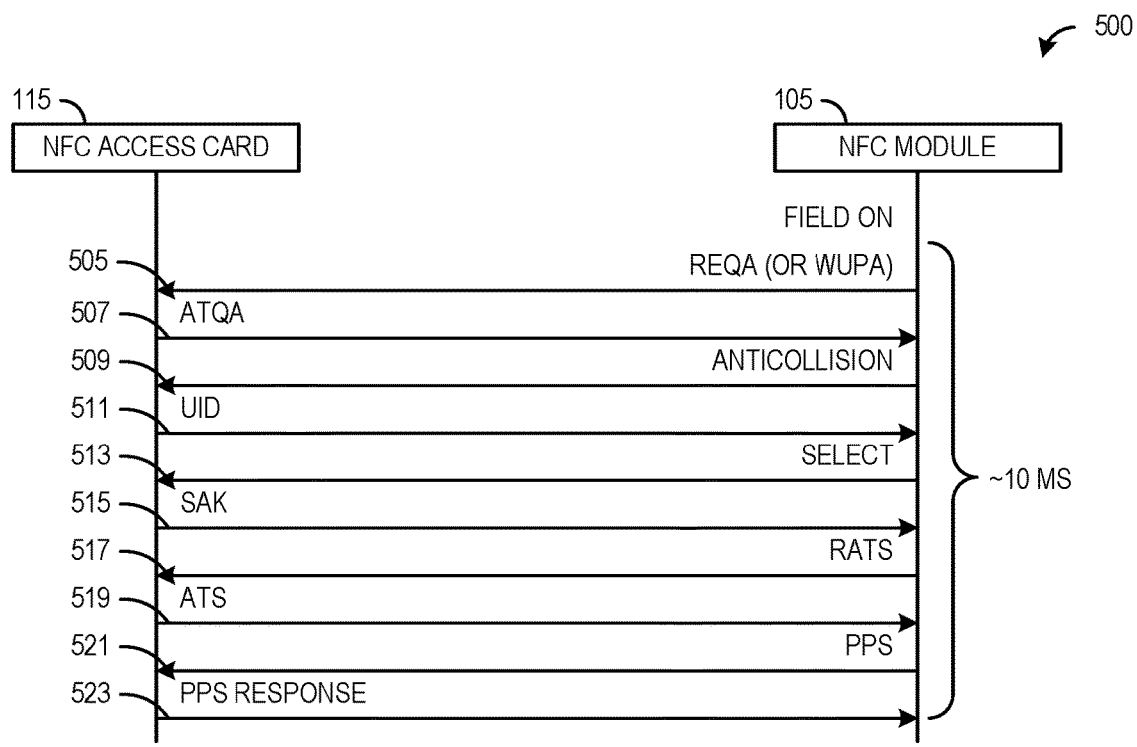
FIG. 5 illustrates a diagram of communications occurring between the access card and the wireless module as the devices participate in an activation process.

FIG. 5 illustrates a diagram 500 of communications occurring between access card 115 and wireless module 105 as the devices participate in an activation process. Wireless module 105 sends a request message for card type A (REQA) or a wakeup message for card type A (WUPA) command to access card 115 (event 505). The REQA or WUPA command wakes up access card 115. Access card 115 responds with an answer to request for card type A (ATQA) response (event 507). Wireless module 105 initiates an anti-collision multi-access process (event 509).

Access card 115 responds with a user identifier UID (event 511). The UID is a unique identifier associated with access card 115. Wireless module 105 sends a select command (event 513). The select command indicates to access card 115 that wireless module 105 has selected access card 115. Access card 115 sends a select acknowledge (SAK) to wireless module 105 (event 515). Wireless module 105 sends a request for answer to select (RATS) command to access card 115 (event 517). The RATS command forces access card 115 to respond to the select command. Access card 115 sends an answer to the select (ATS) message to wireless module 105 (event 519).

Wireless module 105 sends a protocol parameter selection (PPS) command to access card 115 (event 521). The PPS command specifies the parameters used in the communication. Access card 115 sends a PPS response message to wireless module 105. The PPS response message includes acknowledgement of the receipt of the parameters. Overall, execution of the activation process occurs in approximately 10 milliseconds.

Figure 6:
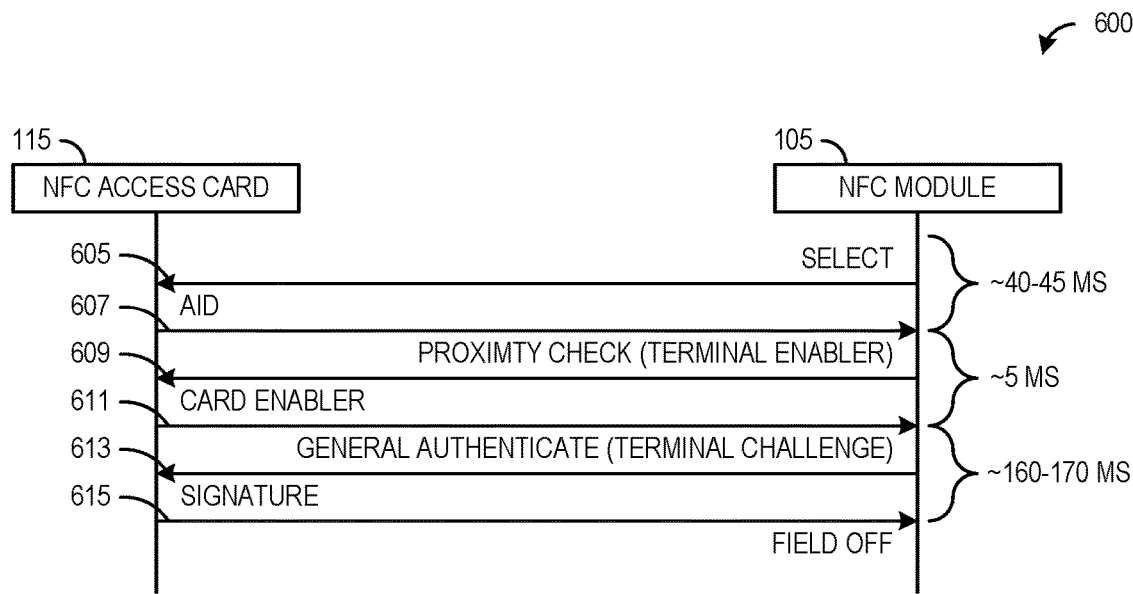
FIG. 6 illustrates a diagram of communications occurring between the access card and the wireless module as the devices exchange application protocol data unit (APDU) commands to validate the authenticity and proximity of the access card according to example embodiments presented herein.

FIG. 6 illustrates a diagram 600 of communications occurring between access card 115 and wireless module 105 as the devices exchange APDU commands to validate the authenticity and proximity of access card 115. The validation of access card 115 includes a proximity check and a general authentication. In an embodiment, to validate access card 115, access card 115 must pass both the proximity check and the general authentication. Failure of either the proximity check or the general authentication (or both) results in the invalidation of access card 115.

The communications shown in diagram 600 is not intended to present a detailed view of the validation of access card 115. Rather, diagram 600 provides a view of the communications exchanged between wireless module 105 and access card 115 during the validation of access card 115 without giving any details on what information is communicated by wireless module 105 and access card 115.

The validation of access card 115 may include wireless module 105 sending a select command to access card 115 (event 605). The select command indicates to access card 115 that wireless module 105 has selected an application of the access card 115 for validation. Access card 115 sends an application identifier (AID) to wireless module 105 (event 607). The AID identifies an application of access card 115 used in the validation process. If the select command is not included, then access card 115 uses a default application in the validation process.

Wireless module 105 initiates the proximity check (event 609). In an embodiment, the proximity check makes use of an expected time of flight of messages exchanged between access card 115 and wireless module 105, along with an expected processing time for the processing of those messages at access card 115 and wireless module 105. Any significantly greater time would tend to indicate that an attacker is attempting to obtain illicit access to the wireless smart key system. The initiation of the proximity check may involve wireless module 105 starting a timer that measures the elapse time between the initiation of the proximity check and the end of the proximity check, and comparing the value of the timer with a maximum time threshold. If the value of the timer is less than or equal to the maximum time threshold, access card 115 is determined to have passed the proximity check. If the value of the timer is greater than the maximum time threshold, access card 115 is determined to have failed the proximity check. Access card 115 sends a response message (event 611). The response message marks the end of the proximity check. A detailed discussion of the proximity check is provided below. The proximity check may also include the comparison of the value of the timer with a minimum time threshold, to make more difficult to emulate access card 115. The minimum time threshold may help to detect situations where an attacker stores a response to a proximity check, enabling the attacker to quickly respond to the proximity check. The maximum time threshold and the minimum time threshold may be specified by a technical standard or an operator or designer of the wireless smart key system.

Wireless module 105 initiates the general authentication of access card 115 (event 613). The initiation of the general authentication of access card 115 may involve wireless module 105 sending a command to access card 115 to initiate the general authentication. Access card 115 may respond by generating a signature and sending the signature to wireless module 105 (event 615). Wireless module 105 authenticates access card 115 using the signature received from access card 115. A detailed discussion of the general authentication of access card 115 is provided below.

In an embodiment, the validation of access card 115 involves access card 115 and module 105 sharing unique randomly generated values associated with wireless module 105 and access card 115. The unique randomly generated values, including a terminal enabler value associated with wireless module 105, a card enabler value associated with access card 115, and a terminal challenge value associated with wireless module 105, may be use to authenticate access card 115 in the general authentication of access card 115. As an example, the signature received from access card 115 covers the terminal enabler value, the card enabler value, and the terminal challenge value. Hence if any one or more of these values differs from their expected values (e.g., an attacker changed one or more of these values), the signature received from access card 115 would differ from the signature generated by wireless module 105. The different signatures would invalidate access card 115. The terminal enabler value may be an 8-byte long randomly generated value generated by module 105, although another length value may be used. The card enabler value may be an 8-byte long randomly generated value generated by access card 115, although another length value may be used. The terminal challenge value may be a 16-byte long randomly generated value generated by wireless module 105, although another length value may be used. As an example, longer randomly generated values would make techniques employing exhaustive search to circumvent the authentication of access card 115 more intractable.

In an embodiment, the validation of access card 115 involves a proximity check, which measures the elapsed time spanning the approximate initiation of the proximity check to the approximate receipt of a response to the initiation of the proximity check. If the elapsed time is less than or equal to a maximum time threshold, access card 115 is determined to have passed the relay attack check. The maximum time threshold may be specified in a technical standard or by a designer or operator of the wireless smart key system, for example. Alternatively, the maximum time threshold may be determined by wireless module 105 during a training session where multiple iterations of the proximity check are performed to measure the time threshold. The maximum time threshold may be about equal to the sum of the expected elapsed time for the transmission of the command initiating the proximity check and the expected elapsed time for the transmission of the response to the initiation of the proximity check. A small amount of time may be added to accommodate slight differences in transmission times.

In an embodiment, the validation of access card 115 involves a general authentication of access card 115, which verifies the authenticity of access card 115. The general authentication of access card 115 ensures that an attacker is not able to simply spoof the messaging involved in the proximity check with falsely generated card enabler values to pass the proximity check.

In an embodiment, the validation of access card 115 involves access card 115 generating a signature that covers the terminal enabler value, the card enabler value, and the terminal challenge value. The signature may be generated using a private key of access card 115, for example. The signature may then be sent to wireless module 105, and wireless module 105 generates its own version of the signature using a public key of access card 115. If the signatures match, then access card 115 is determined to have passed the general authentication process. If the signatures do not match, then access card 115 is determined to have not passed the general authentication process. Other signature generating techniques may be used.

In an embodiment, the validation of access card 115 involves access card 115 passing both the proximity check and the general authentication. If access card 115 fails one or both, access card 115 is invalidated. In an embodiment, the proximity check is performed prior to the general authorization to share the values (i.e., the terminal enabler value, the card enabler value, and the terminal challenge value) used in the general authentication.

In an embodiment, to improve the detection sensitivity of the proximity check, multiple proximity checks may be utilized. The utilization of multiple proximity checks may maximize the delay introduced by the relay attack. Each of the multiple proximity checks may exchange a portion of the terminal enabler value and the card enabler value, instead of the entirety of the 8-bytes. Alternatively, the terminal enabler value and the card enabler value are longer. In the situation when portions of the terminal enabler value and the card enabler value are sent, wireless module 105 and access card 115 collect the respective portions to generate the whole terminal enabler and card enabler values. Wireless module 105 measures each of the multiple proximity checks and determines a summation of the response times, and compares the summation with the specified maximum time threshold.

Figure 7:
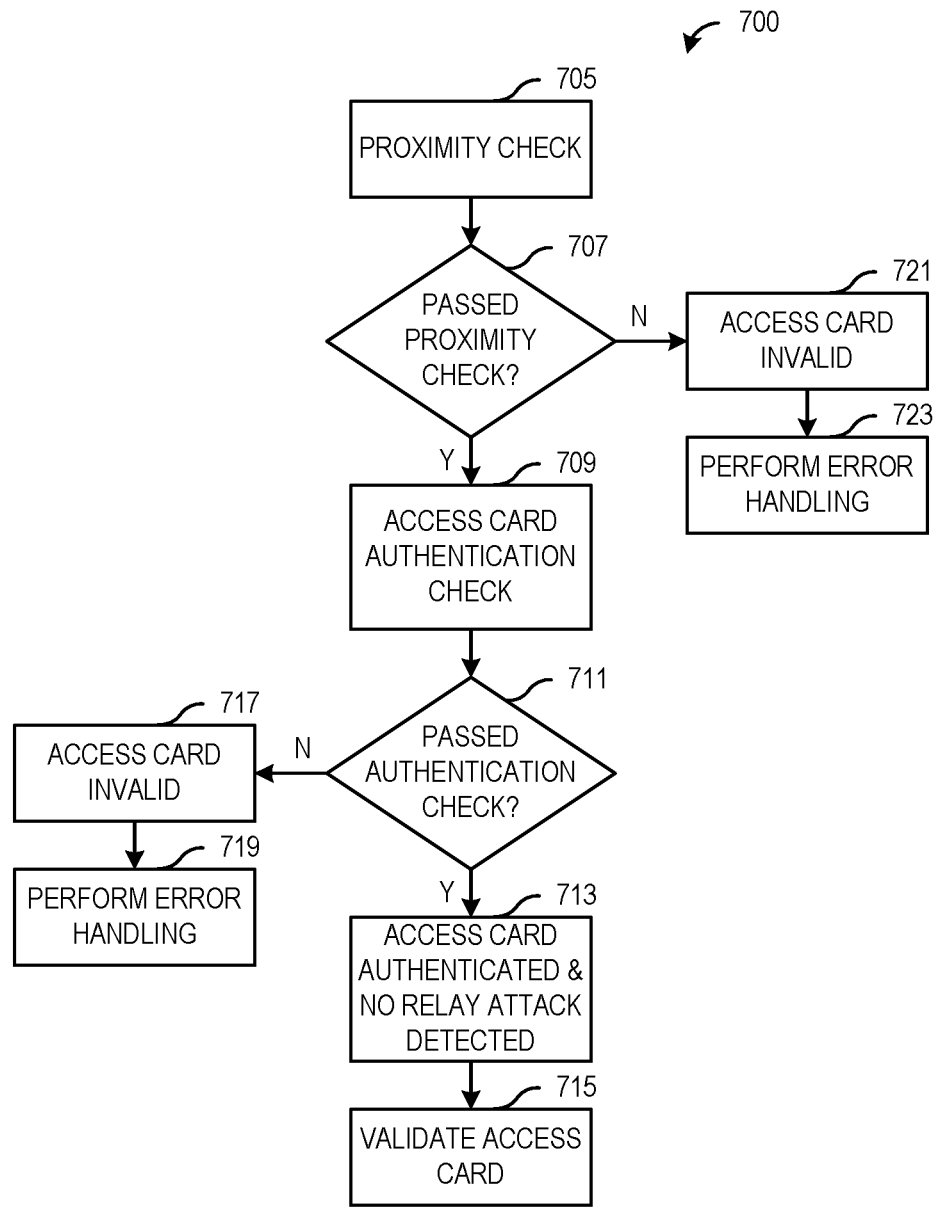
FIG. 7 illustrates a flow diagram of example high-level operations occurring in the wireless module as the module participates in the validation of the authenticity and proximity of the access card according to example embodiments presented herein.

FIG. 7 illustrates a flow diagram of example high-level operations 700 occurring in a module as the module participates in the validation of the authenticity and proximity of an access card. Operations 700 may be indicative of high-level operations occurring in a module, such as module 105, as the module participates in the validation of the authenticity and proximity of an access card, such as access card 115. A discussion of detailed operations is presented below.

Operations 700 begin with the module performing a proximity check (block 705). The proximity check determines the presence of a relay attack by measuring the latency associated with the access card responding to a command issued by the wireless module. For example, the wireless module may measure the latency by starting a timer before or after issuing the command and then stopping the timer when the response is received from the access card. In general, if a relay attack is present, the additional latency introduced by the relay attack (which may include store and forward latency occurring at the proxy and the mole, as well as any processing at the proxy and the mole) would result in the measured latency exceeding a maximum time threshold. In an embodiment, the proximity check is also used to share values (i.e., the terminal enabler value, the card enabler value, and the terminal challenge value) used in the general authentication.

The wireless module performs a check to determine if the access card passed the proximity check (block 707). The check to determine if the access card passed the proximity check may be implemented as a comparison of the value of the timer (i.e., the latency associated with the access card responding to the command from the wireless module) with the maximum time threshold. If the value of the timer is less than or equal to the maximum time threshold, the access card is determined to have passed the proximity check, for example. If the value of the timer is greater than the maximum time threshold, the access card is determined to have passed the proximity check, for example.

If the access card passed the proximity check (block 707), the wireless module performs the general authentication to check the authentication of the access card (block 709). The access card uses encryption (e.g., public-private key encryption) to generate a signature that covers the shared values (i.e., the terminal enabler value, the card enabler value, and the terminal challenge value). The access card provides the signature to the wireless module. The wireless module also uses encryption and the shared values to verify that the signature covers the shared values. The wireless module performs a check to determine if the access card passed the authentication check (block 711). The check to determine if the access card passed the authentication check may be implemented as a verification that the received signature covers the shared values. If the received signature covers the shared values, the access card is determined to have passed the authentication check. If the received signature does not cover the shared values, the access card is determined to have failed the authentication check.

If the access card passed the authentication check (block 711), the access card is authenticated and no relay attack has been detected (block 713). Hence, the authentication and proximity of the access card is validated (block 715) and access to automobile 107 for the access card is granted. Access to automobile 107 may include opening the doors of automobile 107, as well as starting the engine or motor of automobile 107.

If the access card failed the authentication check (block 711), the access card is determined to be invalid (block 717). Because the access card must pass both the proximity check and the authentication check, failure of the authentication check means that the access card is invalid. The wireless module performs error handling (block 719). Error handling may include repeating the validation of the access card, for example. In an embodiment, the validation of the access card may be repeated a specified number of times before the wireless module halts its attempts to validate the access card. As an example, the specified number of times may be 1, 2, 3, 4, 5, and so on. The specified number of times may be specified in a technical standard or by a designer or operator of the wireless smart key system, for example. Error handling may include flashing the lights or sounding the horn of automobile 107, for example. Error handling may include pushing a notification to a cellular device associated with the access card or automobile 107, for example. Error handling may include pushing a notification to the wireless card or a key fob including the wireless card, where the key fob may flash an LED or generate a sound, for example.

If the access card failed the proximity check (block 707), the access card is determined to be invalid (block 721). Because the access card must pass both the proximity check and the authentication check, failure of the proximity check means that the access card is invalid. The module performs error handling (block 723). Error handling may include repeating the validation of the access card, for example. In an embodiment, the validation of the access card may be repeated a specified number of times before the module halts its attempts to validate the access card. As an example, the specified number of times may be 1, 2, 3, 4, 5, and so on. The specified number of times may be specified in a technical standard or by a designer or operator of the wireless smart key system, for example. Error handling may include flashing the lights or sounding the horn of automobile 107, for example. Error handling may include pushing a notification to a cellular device associated with the access card or automobile 107, for example. Error handing may include pushing a notification to the wireless card or a key fob including the wireless card, for example.

Figures 8, 9:
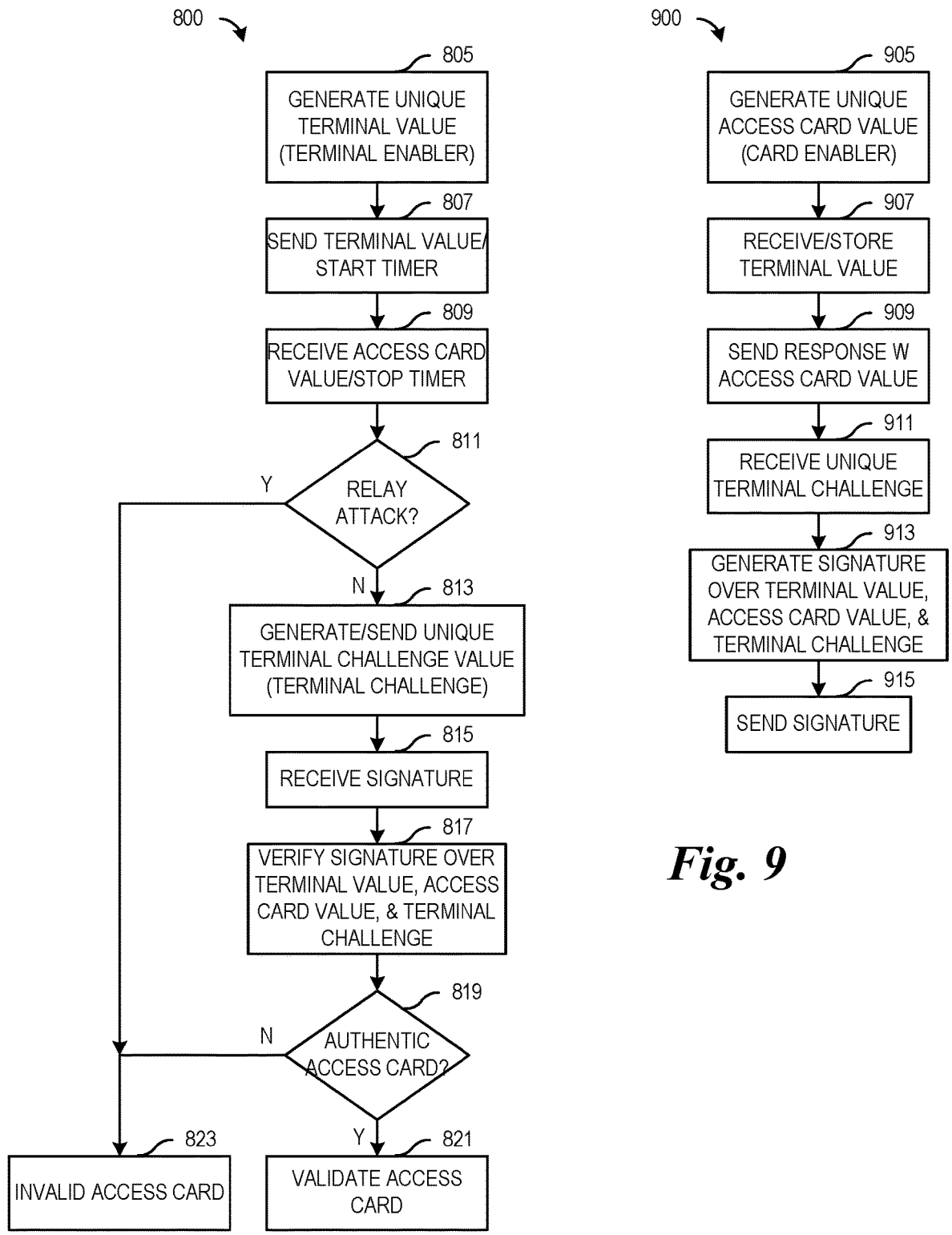
FIG. 8 illustrates a flow diagram of example operations occurring in the wireless module participating in the validation of the authenticity and proximity of the access card according to example embodiments presented herein.
FIG. 9 illustrates a flow diagram of example operations occurring in the access card participating in the validation of the authenticity and proximity of the access card according to example embodiments presented herein.

FIG. 8 illustrates a flow diagram of example operations occurring in a module participating in the validation of the authenticity and proximity of an access card. Operations 800 may be indicative of operations occurring in a wireless module, such as wireless module 105, as the module participates in the validation of the authenticity and proximity of an access card, such as access card 115. Operations 800 provide a detailed view of an example validation of the authenticity and proximity of the access card as performed by the wireless module.

Operations 800 begin with the wireless module generating a unique terminal enabler value (block 805). The terminal enabler value may be a randomly generated 8-byte long value, for example, although other length values are possible. The wireless module stores the terminal enabler value for subsequent use and the terminal enabler value will be referred to as the local terminal enabler value to represent the terminal enabler value that is generated by the wireless module.

The wireless module sends the terminal enabler value to the access card and starts a timer (block 807). The terminal enabler value may be sent to the access card in a command message, for example. If there is no relay attack, the access card receives the command message with the terminal enabler value (which will be referred to as the remote terminal enabler value), and the local terminal enabler value and the remote terminal enabler value are equal. If there is a relay attack, the wireless module will receive the response in a time greater than the maximum time threshold. If there is an attempt to bypass the proximity check, it is possible that part of the relay attack will change the terminal enabler value. In such a situation, the local terminal enabler value and the remote terminal enabler value are different. The timer may be started before the command message is sent or after the command message is sent. The timer should have sufficient resolution to measure the latency associated with the access card responding to the command. As an example, the timer should have resolution on the order of tenths of nanoseconds.

The wireless module receives the response from the access card and stops the timer (block 809). The response from the access card comprising the response to the command sent by the wireless module in block 807. The response includes the card enabler value, which may be a randomly generated 8-byte long value generated by the access card, for example, although other length values are possible. The wireless module stores the card enabler value for subsequent use and the card enabler value will be referred to as the remote card enabler value to represent the card enabler value that is received from the access card. The card enabler value stored at the access card is referred to as the local card enabler value. If there is no relay attack, the wireless module receives the response with the card enabler value, and the local card enabler value and the remote card enabler value are equal. If there is a relay attack, the wireless module will receive the response in a time greater than the maximum time threshold. If there is an attempt to bypass the proximity check, it is possible that part of the relay attack will change the card enabler value. In such a situation, the local card enabler value and the remote card enabler value are different.

The wireless module performs a check to determine if there is a relay attack (block 811). The check to determine if there is a relay attack comprises comparing the timer value with the maximum time threshold, for example. If the timer value is less than or equal to the maximum time threshold, then there is no relay attack. If the timer value is greater than the maximum time threshold, then there may be a relay attack. In an embodiment, if the timer value is greater than the maximum time threshold, the wireless module may repeat the proximity check (i.e., blocks 805, 807, 809, and 811) a specified number of times to ensure that an anomaly did not cause the false detection of a relay attack. The specified number of times may be specified by a technical standard or a designer or operator of the wireless smart key system, for example.

If there is no relay attack (block 811), the wireless module generates and sends a unique terminal challenge value (block 813). The terminal challenge value may be a randomly generated 16-byte long value, for example, although other length values are possible. The wireless module saves the terminal challenge value (which is referred to as the local terminal challenge value). The terminal channel value may be sent in a command message to the access card. If there is no relay attack, the access card receives the command message with the terminal challenge value (which will be referred to as the remote terminal challenge value), and the local terminal challenge value and the remote terminal challenge value are equal. If there is a relay attack, the wireless module will receive the response in a time greater than the maximum time threshold. If there is an attempt to bypass the proximity check, it is possible that part of the relay attack will change the terminal challenge value. In such a situation, the local terminal challenge value and the remote terminal challenge value are different.

The module receives a response from the access card (block 815). The response from the access card includes a signature (e.g., an Elliptic Curve Digital Signature Algorithm (ECDSA) signature) that is generated by the access card using a private key of the access card. The signature covers the remote terminal enabler value, the local card enabler value, and the remote terminal challenge value, for example. In general, the signature may be computed with other algorithms, such as symmetric algorithms based on secret keys (e.g., data encryption standard (DES), advanced encryption standard (AES), etc.), asymmetric algorithms based on private-public keys (e.g., ECDSA, Rivest-Shamir-Adlerman (RSA), etc.), and so on. Symmetric and asymmetric algorithms each offer their own advantages and disadvantages, and the designer or operator of the wireless smart key system may select an algorithm that meets specific requirements to implement.

The wireless module verifies that the signature covers the local terminal enabler value, the remote card enabler value, and the local terminal challenge value (block 817). The wireless module may verify that the signature covers the local terminal enabler value, the remote card enabler value, and the local terminal challenge value by using a public key of the access card and the local terminal enabler value, the remote card enabler value, and the local terminal challenge value, for example.

The wireless module performs a check to determine if the access card is authentic (block 819). The access card is authentic if the signature covers the local terminal enabler value, the remote card enabler value, and the local terminal challenge value. The card is not authentic if the signature does not cover the local terminal enabler value, the remote card enabler value, and the local terminal challenge value. If the access card is authentic, the module validates the access card (block 821). Validating the access card means that the access card has passed the proximity check and has been authenticated.

If the access card is not authentic (block 819), the access card is invalid. Because the access card must pass both the proximity check and the authentication check, failure of the authentication check means that the access card is invalid. If a relay attack is detected (block 811), the access card is invalid. Because the access card must pass both the proximity check and the authentication check, failure of the proximity check means that the access card is invalid.

FIG. 9 illustrates a flow diagram of example operations occurring in an access card participating in the validation of the authenticity and proximity of the access card. Operations 900 may be indicative of operations occurring in an access card, such as access card 115, as the access card participates in the validation of the authenticity and proximity of the access card. Operations 900 provide a detailed view of an example validation of the authenticity and proximity of the access card as performed by the access card.

Operations 900 begin with the access card generating a unique card enabler value (block 905). The card enabler value may be a randomly generated 8-byte long value, for example, although other length values are possible. The access card stores the card enabler value for subsequent use and the card enabler value will be referred to as the local terminal enabler value to represent the card enabler value that is generated by the access card.

The access card receives a command message from the wireless module (block 907). The command message includes the terminal enabler value. The access card stores the terminal enabler value. If there is no relay attack, the access card receives the command message with the terminal enabler value (which will be referred to as the remote terminal enabler value), and the local terminal enabler value and the remote terminal enabler value are equal. If there is an attempt to bypass the proximity check, it is possible that part of the relay attack will change the terminal enabler value. In such a situation, the local terminal enabler value and the remote terminal enabler value are different.

The access card sends a response to the command message (block 909). The response to the command message includes the card enabler value (which is stored at the module as the remote card enabler value). The wireless module stores the card enabler value for subsequent use and the card enabler value will be referred to as the remote card enabler value to represent the card enabler value that is received from the access card. If there is no relay attack, the wireless module receives the response with the card enabler value, and the local card enabler value and the remote card enabler value are equal. If there is an attempt to bypass the proximity check, it is possible that part of the relay attack will change the card enabler value. In such a situation, the local card enabler value and the remote card enabler value are different.

The access card receives a command message with the terminal challenge value (block 911). The access card stores the terminal challenge value, where it is referred to as the remote terminal challenge value. If there is no relay attack, the local terminal challenge value and the remote terminal challenge value are equal. If there is an attempt to bypass the proximity check, it is possible that part of the relay attack will change the terminal challenge value. In such a situation, the local terminal challenge value and the remote terminal challenge value are different.

The access card generates a signature (block 913). The signature may be generated using a private key of the access card and covers the remote terminal enabler value, the local card enabler value, and the remote terminal challenge value, for example. Other algorithms may be used to generate the signature. The access card sends the signature (block 915). The signature may be sent in a response message to the wireless module, for example.

Figure 10:
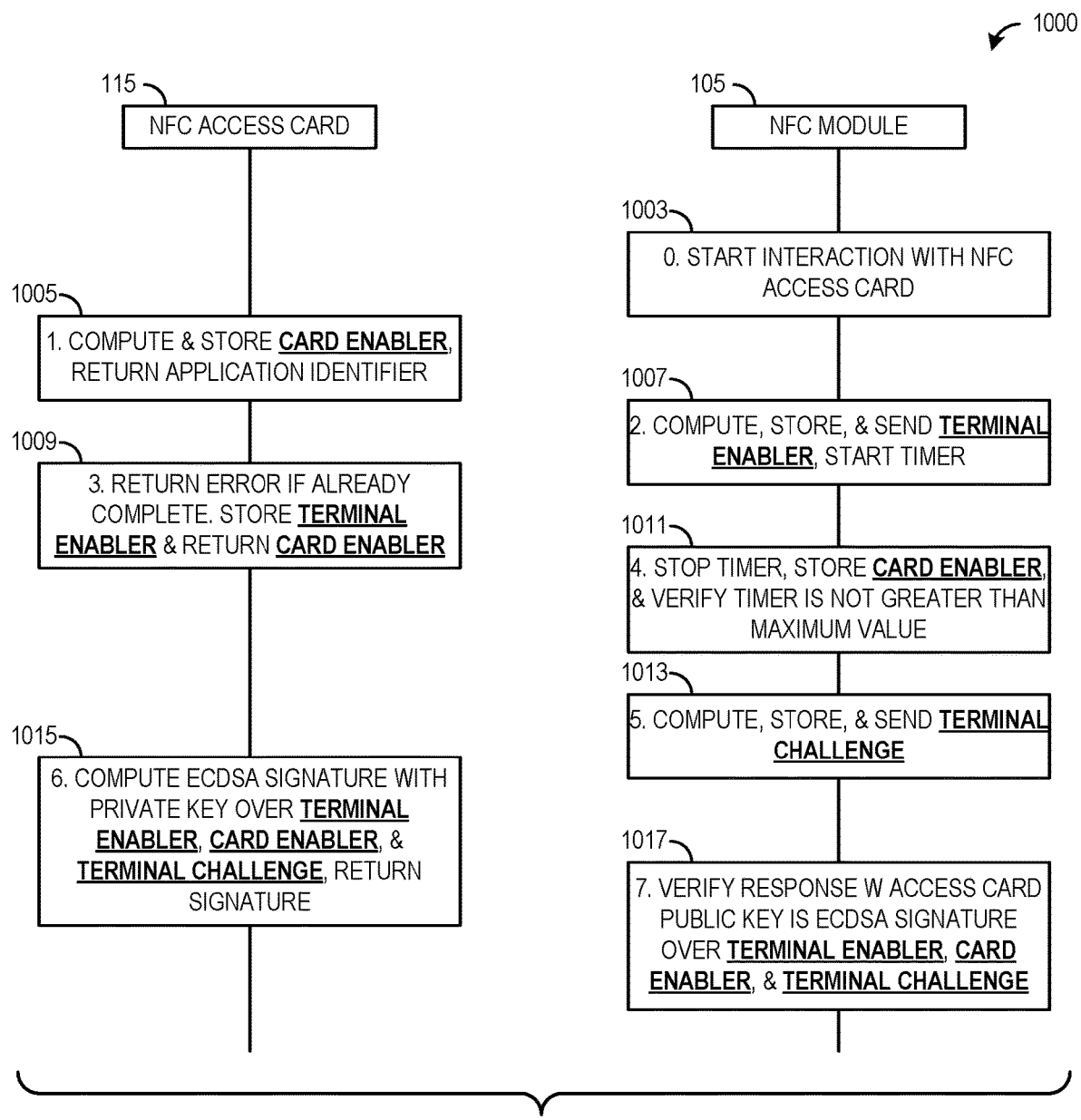
FIG. 10 illustrates a diagram of example operations occurring at the wireless module and the access card during the validation of the authenticity and proximity of the access card according to example embodiments presented herein.

FIG. 10 illustrates a diagram 1000 of example operations occurring at wireless module 105 and access card 115 during the validation of the authenticity and proximity of access card 115. Wireless module 105 initiates interaction with access card 115 (block 1003). Interaction with access card 115 may be initiated with a select command, for example. At access card 115 power-up, if the application is selected by default at power-up, or at application selection, access card 115 computes and stores the card enabler value (which may be a randomly generated 8-byte long value) (block 1005). If the application is explicitly selected by means of a SELECT by application identifier (AID) command, access card 115 may send the AID and other information to wireless module 105. Wireless module 105 computes, stores, and sends the terminal enabler value (which may be a randomly generated 8-byte long value) to access card 115 (block 1007). The terminal enabler value may be sent in a command message. Wireless module 105 also starts a timer to measure the latency associated with the response to the command message.

Access card 115 receives and stores the terminal enabler value and sends the card enabler value to wireless module 105 (block 1009). The card enabler value may be sent in a response to the command message. Wireless module 105 receives and stores the card enabler value (block 1011). Wireless module 105 also stops the timer and verifies that the value of the timer is less than or equal to the maximum time threshold. In other words, wireless module 105 verifies that the latency associated with the response to the command message is less than or equal to the maximum time threshold.

Wireless module 105 computes, stores, and sends the terminal challenge value (which may be a 16-byte long value) to access card 115 (block 1013). Access card 115 generates a signature using the private key associated with access card 115 and sends the signature to wireless module 105 (block 1015). The signature covers the terminal enabler value, the card enabler value, and the terminal challenge value, for example. Wireless module 105 receives the signature and verifies the signature (block 1017). Wireless module 105 verifies that the signature covers the terminal enabler value, the card enabler value, and the terminal challenge value using the public key associated with access card 115, for example.

Figure 11:
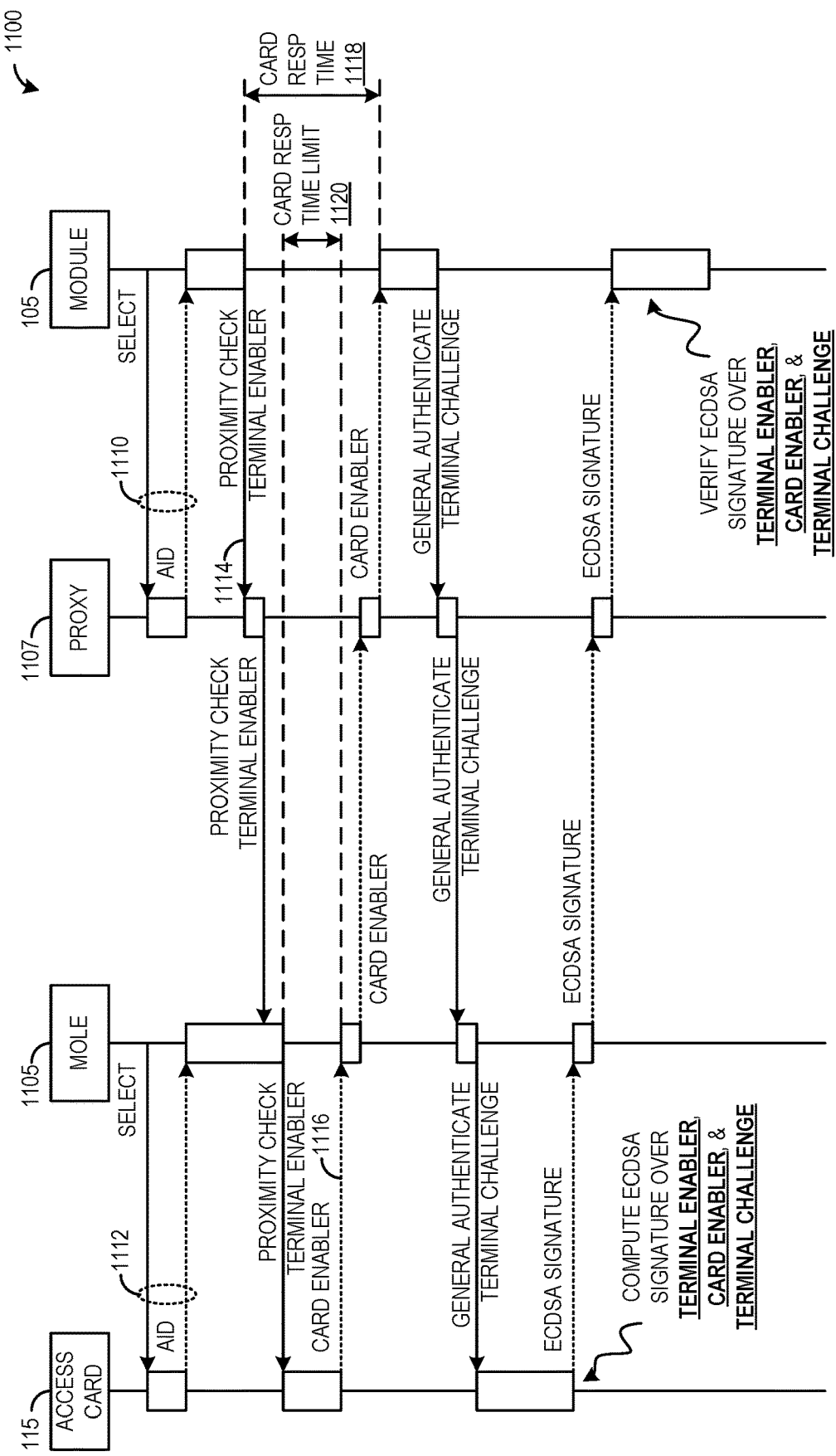
FIG. 11 illustrates a diagram of communications exchanged by entities participating in the validation of the authenticity and proximity of the access card, highlighting a first relay attack scenario according to example embodiments presented herein.

FIG. 11 illustrates a diagram 1100 of communications exchanged by entities participating in the validation of the authenticity and proximity of access card 115, highlighting a first relay attack scenario. The entities involved in the validation of access card 115 include access card 115, wireless module 105, mole 1105, and proxy 1107. In the first relay attack scenario, mole 1105 and proxy 1107 react to the validation of access card 115 as initiated by wireless module 105.

The validation process optionally begins with wireless module 105 sending a command message to select the authentication application present in proxy that appears to the module in effect as an access card 115. Proxy 1107 receives the command message and sends a response message with an AID associated with the application present in access card 115 (events 1110). Mole 1105, operating in conjunction with proxy 1107, sends a command message to access card 115 to select the authentication application present in access card 115, which sends a response message with an AID associated with the application present in access card 115 (events 1112).

Wireless module 105 initiates the proximity check by sending a command message with the terminal enabler value and starting the timer (event 1114). The command message is received by proxy 1107, which forwards the command message to mole 1105, which forwards the command message to access card 115. Access card 115 responds to the control message with the card enabler value (event 1116). The response is received by mole 1105, which forwards the response to proxy 1107, which forwards the response to wireless module 105.

Wireless module 105 stops the timer and checks to determine if the latency associated with the response to the command message (CARD RESP TIME 1118) meets the maximum time threshold (CARD RESP TIME LIMIT 1120). As shown in FIG. 11, the latency associated with the response to the command message is greater than the maximum time threshold, hence, a relay attack is detected and access card 115 is invalid. The additional communications shown in FIG. 11 may occur but are not necessary because access card 115 is invalid.

Figure 12:
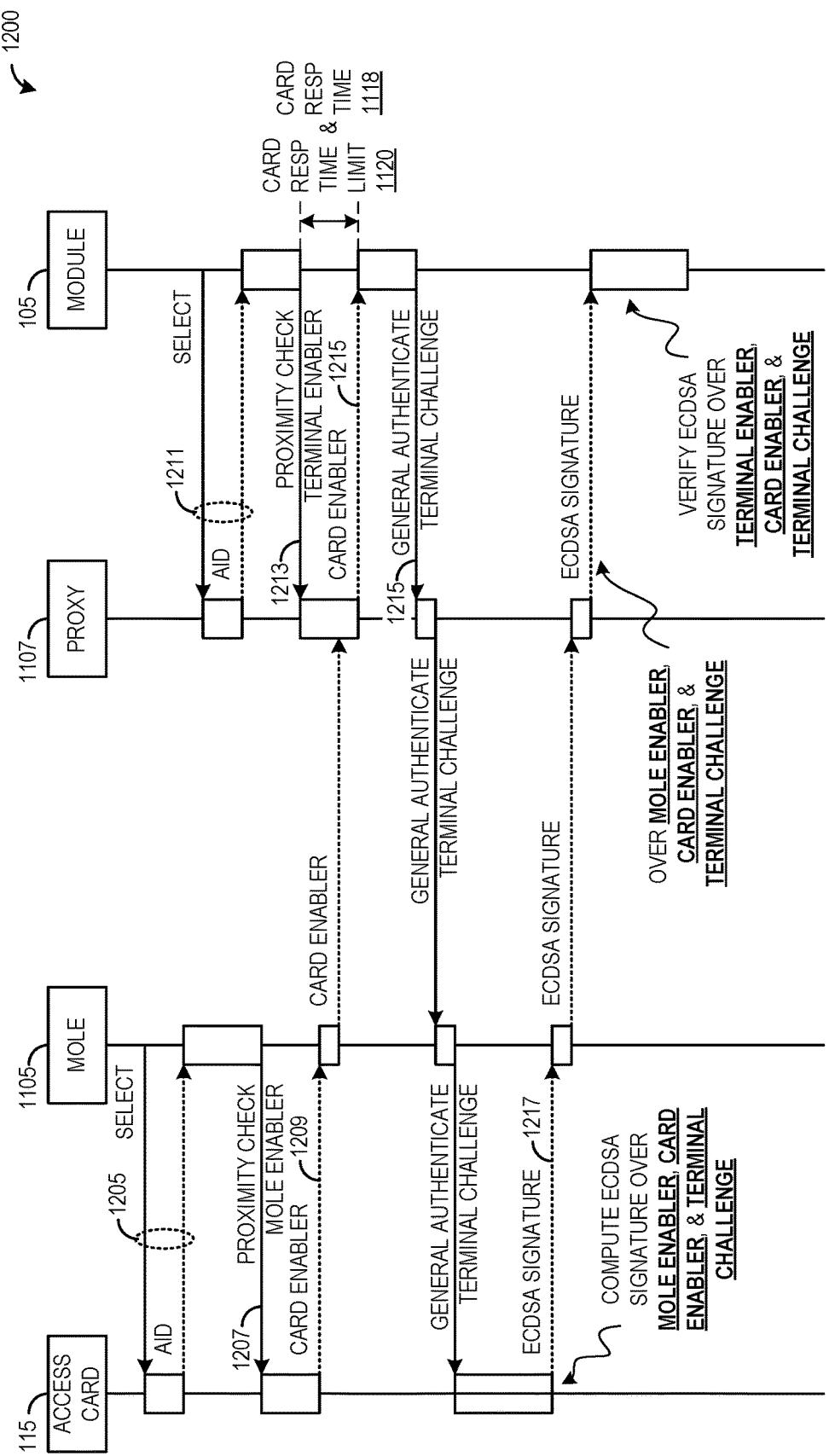
FIG. 12 illustrates a diagram of communications exchanged by entities participating in the validation of the authenticity and proximity of the access card, highlighting a second relay attack scenario according to example embodiments presented herein.

FIG. 12 illustrates a diagram 1200 of communications exchanged by entities participating in the validation of the authenticity and proximity of access card 115, highlighting a second relay attack scenario including an attempt to bypass relay attack countermeasures. The entities involved in the validation of access card 115 include access card 115, wireless module 105, mole 1105, and proxy 1107. In the second relay attack scenario, mole 1105 and proxy 1107 operate in a preemptive manner to the validation of access card 115 as initiated by wireless module 105.

Rather than simply responding to the validation of access card 115 as shown in FIG. 11, mole 1105 and proxy 1107 operate preemptively. Even before receiving a command message from wireless module 105 initiating the validation of access card 115, mole 1105 sends a command message to select access card 115, which responds with an AID associated with access card 115 (events 1205). Mole 1105 also sends a spoofed command message to falsely initiate the validation of access card 115 (event 1207). The spoofed command message includes a mole enabler value because mole 1105 has no knowledge of the terminal enabler value since the terminal enabler value is a randomly generated value. Access card 115 stores the mole enabler value and responds with the card enabler value (event 1209), which gets forwarded to proxy 1107.

At some time, wireless module 105 sends a command message to select access card 115 and starts the timer. However proxy 1107 receives the command message and sends a response message with an AID associated with proxy 1107 (events 1211). Wireless module 105 initiates the relay attack check by sending a command message with the terminal enabler value (event 1213). Proxy 1107 is able to quickly respond to the command message because mole 1105 had previously spoofed access card 115 into sending the response with the card enabler value (event 1215). Because proxy 1107 is able to quickly respond, the response is received at wireless module 105 within the maximum time threshold. Hence, the proximity check passes. As discussed previously, it is possible to detect this attack situation by comparing the elapsed time involved with the proximity check with the minimum time threshold.

Wireless module 105 initiates the general authentication of access card 115 by sending a command message with the terminal challenge value (event 1215). However, proxy 1107 receives the command message and forwards the command message to mole 1105, which forwards the command message to access card 115.

Access card 115 generates the signature covering the mole enabler value, the card enabler value, and the terminal challenge value. Access card 115 covers the mole enabler value rather than the terminal enabler value because the command message initiating the relay attack check supplied the mole enabler value not the terminal enabler value. Access card 115 sends a response message including the signature to wireless module 105 (event 1217). The response message is received by mole 1105, which forwards the response message to proxy 1107, which forwards the response message to wireless module 105.

Wireless module 105 verifies if the signature covers the terminal enabler value, the card enabler value, and the terminal challenge value, which results in failure because the signature covers the mole enabler value, the card enabler value, and the terminal challenge value. Hence, access card 115 fails the general authentication and access card 115 is invalid.

Figure 13:
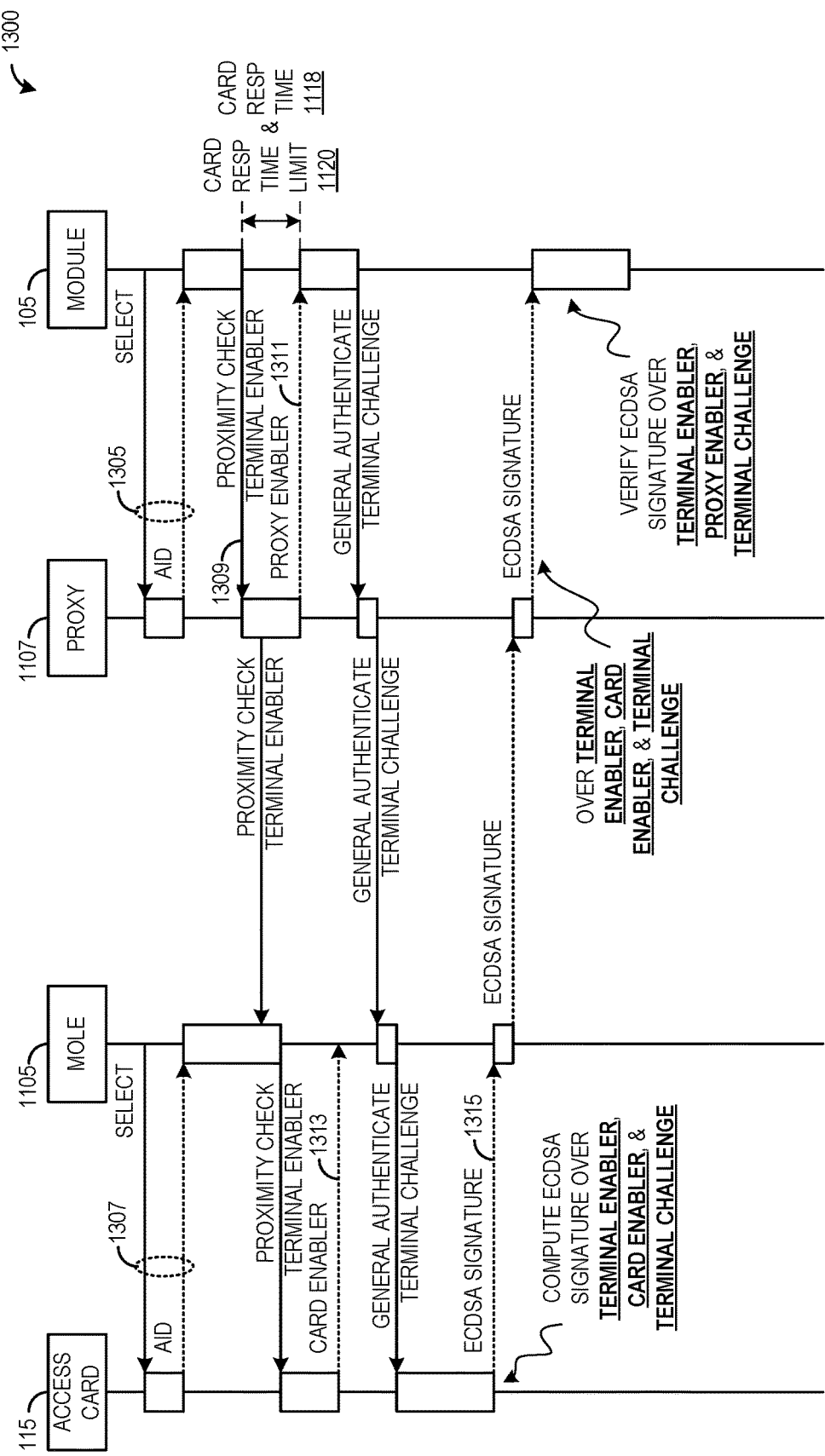
FIG. 13 illustrates a diagram of communications exchanged by entities participating in the validation of the authenticity and proximity of the access card, highlighting a third relay attack scenario according to example embodiments presented herein.

FIG. 13 illustrates a diagram 1300 of communications exchanged by entities participating in the validation of the authenticity and proximity of access card 115, highlighting a third relay attack scenario including an attempt to bypass relay attack countermeasures. The entities involved in the validation of access card 115 include access card 115, wireless module 105, mole 1105, and proxy 1107. In the third relay attack scenario, proxy 1107 attempts to fool module 105 by spoofing a response to a command message from wireless module 105.

Instead of preemptively responding to a command message initiating the relay attack check, proxy 1107 attempts to fool wireless module 105 by spoofing a response to the command message from wireless module 105.

The validation process optionally begins with wireless module 105 sending a command message to select access card 115. However, proxy 1107 receives the command message and sends a response message with an AID associated with proxy 1107 (events 1305). Mole 1105, operating in conjunction with proxy 1107, sends a command message to access card 115, which sends a response message with an AID associated with access card 115 (events 1307).

Wireless module 105 initiates the relay attack check by sending a command message with the terminal enabler value and starting the timer (event 1309). The command message is received by proxy 1107, which spoofs access card 115 by sending a response to the command message to wireless module 105 (event 1311). The spoofed response includes a proxy enabler value instead of the card enabler value because proxy 1107 has no knowledge of the card enabler value since the card enabler value is a randomly generated value. Because proxy 1107 is able to quickly respond, the response is received at module 105 within the maximum time threshold. Hence, the proximity check passes. Proxy 1107 also forwards the command message to mole 1105, which forwards the command message to access card 115. Access card 115 sends a response to the command message, which is not forwarded by mole 1105 (event 1313).

Wireless module 105 initiates the general authentication of access card 115 by sending a command message with the terminal enabler value (event 1215). However, proxy 1107 receives the command message and forwards the command message to mole 1105, which forwards the command message to access card 115.

Access card 115 generates the signature covering the terminal enabler value, the card enabler value, and the terminal challenge value. Access card 115 sends a response message including the signature to wireless module 105 (event 1217). The response message is received by mole 1105, which forwards the response message to proxy 1107, which forwards the response message to module 105.

Wireless module 105 verifies if the signature covers the terminal enabler value, the proxy enabler value, and the terminal challenge value, which results in failure because the signature covers the terminal enabler value, the card enabler value, and the terminal challenge value. Hence, access card 115 fails the general authentication and access card 115 is invalid.

Figure 14:
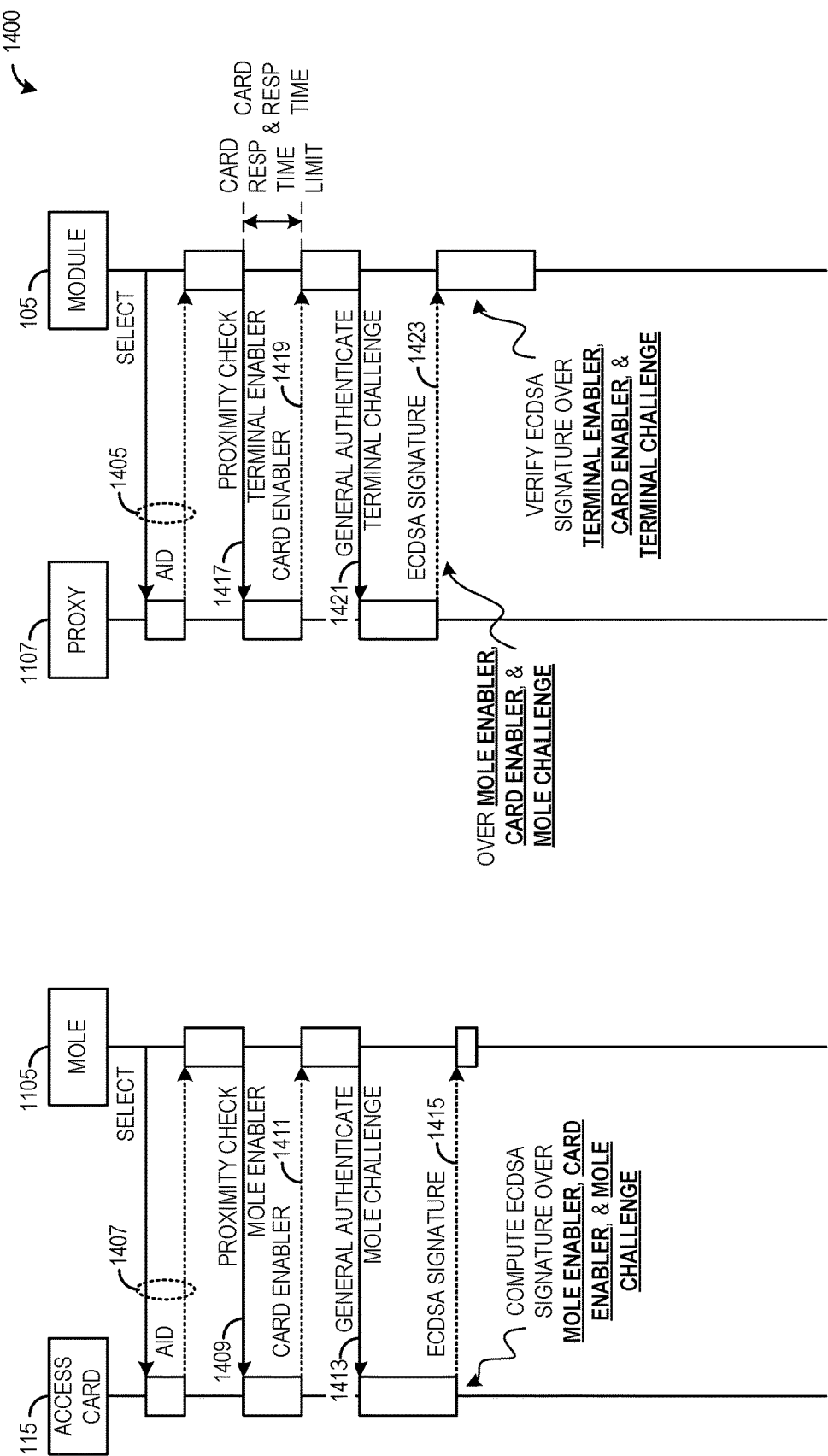
FIG. 14 illustrates a diagram of communications exchanged by entities participating in the validation of the authenticity and proximity of the access card, highlighting a fourth relay attack scenario according to example embodiments presented herein.

FIG. 14 illustrates a diagram 1400 of communications exchanged by entities participating in the validation of the authenticity and proximity of access card 115, highlighting a fourth relay attack scenario including an attempt to bypass relay attack countermeasures. The entities involved in the validation of access card 115 include access card 115, wireless module 105, mole 1105, and proxy 1107. In the fourth relay attack scenario, mole 1105 and proxy 1107 use the card enabler value and signature from a prior access card validation.

Rather than preemptively responding to a command message, mole 1105 and proxy 1107 use values from a prior access card validation. The validation process begins with wireless module 105 sending a command message to select access card 115. However, proxy 1107 receives the command message and sends a response message with an AID associated with proxy 1107 (events 1405). Mole 1105, operating in conjunction with proxy 1107, sends a command message to access card 115, which sends a response message with an AID associated with access card 115 (events 1407).

Mole 1105 sends a spoofed command message to access card 115 to initiate the proximity check (event 1409). The spoofed command message includes a mole enabler value because mole 1105 has no knowledge of the terminal enabler value. Access card 115 sends a response to the spoofed command message to mole 1105 (event 1411). The response includes the card enabler value. Mole 1105 saves and shares the card enabler value with proxy 1107.

Mole 1105 sends a spoofed command message to access card 115 to initiate the general authentication (event 1413). The spoofed command message includes a mole challenge value because mole 1105 has no knowledge of the terminal challenge value. Access card 115 generates and sends a signature that covers the mole enabler value, the card enabler value, and the mole challenge value (event 1415). Mole 1105 saves and shares the signature with proxy 1107.

Sometime after mole 1105 has saved and shared the card enabler value, wireless module 105 initiates the relay attack check by sending a command message with the terminal enabler value and starting the timer (event 1417). The command message is received by proxy 1107, which spoofs access card 115 by sending a response to the command message to wireless module 105 (event 1419). The spoof response includes a previously captured card enabler value. Because proxy 1107 is able to quickly respond, the response is received at wireless module 105 within the maximum time threshold. Hence, the proximity check passes.

Sometime after mole 1105 has saved and shared the signature, wireless module 105 initiates the general authentication of access card 115 by sending a command message with the terminal challenge value (event 1421). However, proxy 1107 receives the command message and sends a response to the command message (event 1423). The response includes the previously captured signature.

Wireless module 105 verifies if the signature covers the terminal enabler value, the card enabler value, and the terminal challenge value, which results in failure because the signature covers the mole enabler value, the card enabler value, and the mole challenge value. Hence, access card 115 fails the general authentication and access card 115 is invalid.

Figures 15, 16:
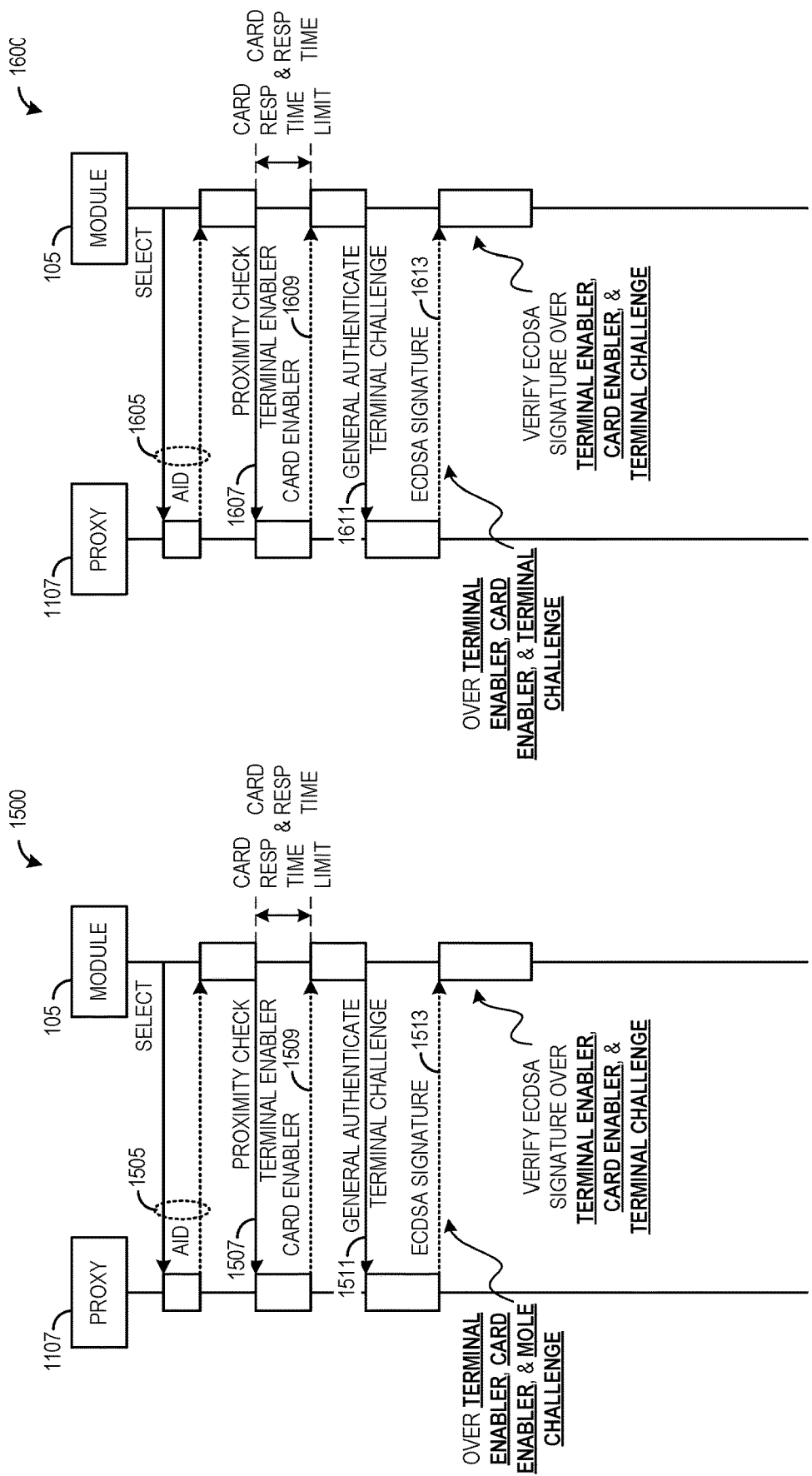
FIG. 15 illustrates a diagram of communications exchanged by entities participating in the validation of the authenticity and proximity of the access card, highlighting a fifth relay attack scenario according to example embodiments presented herein.
FIG. 16 illustrates a diagram of communications exchanged by entities participating in the validation of the authenticity and proximity of the access card, highlighting a sixth relay attack scenario according to example embodiments presented herein.

FIG. 15 illustrates a diagram 1500 of communications exchanged by entities participating in the validation of the authenticity and proximity of access card 115, highlighting a fifth relay attack scenario including an attempt to bypass relay attack countermeasures. The entities involved in the validation of access card 115 include access card 115, wireless module 105, and proxy 1107. In the fifth relay attack scenario, proxy 1107 is able to provide the card enabler value and the signature from a prior access card validation.

Mole 1105 performs a number (e.g., 264) of transactions with access card 115 providing all possible values of the command message initiating the proximity check and a fixed value for the command message initiating the general authentication of access card 115. Mole 1105 stores all card enabler values and signatures received from access card 115 in response to the transactions. Mole 1105 provides the stored values to proxy 1107. Proxy 1107 searches the stored values when a command message (containing the terminal enabler value) initiating the proximity check is received, and responds with the corresponding card enabler value. Proxy 1107 also searches the stored values when a command message (containing the terminal challenge value) initiating the general authorization of access card 115 is received, and responds with the corresponding signature.

The validation process begins with wireless module 105 sending a command message to select access card 115. However, proxy 1107 receives the command message and sends a response message with an AID associated with proxy 1107 (events 1505). Module 105 initiates the proximity check by sending a command message with the terminal enabler value and starting the timer (event 1507). The command message is received by proxy 1107, which spoofs access card 115 by sending a response to the command message to wireless module 105 (event 1509). The spoof response includes a previously captured card enabler value. Because proxy 1107 is able to quickly respond, the response is received at wireless module 105 within the maximum time threshold. Hence, the proximity check passes.

Wireless module 105 initiates the general authentication of access card 115 by sending a command message with the terminal challenge value (event 1511). However, proxy 1107 receives the command message and sends a response to the command message (event 1513). The response includes the previously captured signature that covers the terminal enabler value, the card enabler value, and the mole challenge value. Wireless module 105 verifies if the signature covers the terminal enabler value, the card enabler value, and the terminal challenge value, which results in failure because the signature covers the terminal enabler value, the card enabler value, and the mole challenge value. Hence, access card 115 fails the general authentication and access card 115 is invalid.

FIG. 16 illustrates a diagram 1600 of communications exchanged by entities participating in the validation of the authenticity and proximity of access card 115, highlighting a sixth relay attack scenario including an attempt to bypass relay attack countermeasures. The entities involved in the validation of access card 115 include access card 115, wireless module 105, and proxy 1107. In the sixth relay attack scenario, proxy 1107 is able to provide the card enabler value and the signature from a prior access card validation.

Mole 1105 performs a number (e.g., 264) of transactions with access card 115 providing all possible values of the command message initiating the relay attack check and a fixed value for the command message initiating the general authentication of access card 115. Mole 1105 stores all card enabler values and signatures received from access card 115 in response to the transactions. Mole 1105 provides the stored values to proxy 1107. Proxy 1107 searches the stored values when a command message (containing the terminal enabler value) initiating the proximity check is received, and responds with the corresponding card enabler value. Proxy 1107 also searches the stored values when a command message (containing the terminal challenge value) initiating the general authorization of access card 115 is received, and responds with the corresponding signature.

The validation process begins with wireless module 105 sending a command message to select access card 115. However, proxy 1107 receives the command message and sends a response message with an AID associated with proxy 1107 (events 1605). Wireless module 105 initiates the relay attack check by sending a command message with the terminal enabler value and starting the timer (event 1607). The command message is received by proxy 1107, which spoofs access card 115 by sending a response to the command message to wireless module 105 (event 1609). The spoof response includes a previously captured card enabler value. Because proxy 1107 is able to quickly respond, the response is received at wireless module 105 within the maximum time threshold. Hence, the proximity check passes.

Module 105 initiates the general authentication of access card 115 by sending a command message with the terminal challenge value (event 1611). However, proxy 1107 receives the command message and sends a response to the command message (event 1613). The response includes the previously captured signature that covers the terminal enabler value, the card enabler value, and the terminal challenge value. Wireless module 105 verifies if the signature covers the terminal enabler value, the card enabler value, and the terminal challenge value, which results in success because the signature covers the terminal enabler value, the card enabler value, and the terminal challenge value. Hence, access card 115 passes the general authentication and access card 115 is valid.

Although the exhaustive generation of the card enabler values and the terminal challenge values may be able to facilitate the relay attack on the wireless smart key system as presented herein, the number of transactions required ($2^{256} \sim 1.16 \times 10^{77}$), which will take approximately $7.5 \times 10^{68}$ years, and the amount of data stored ($64*2^{192} = 3.65 \times 10^{37}$ terabytes of data) would make the technique unfeasible to implement. Furthermore, the example embodiments may be made more intractable to this type of exhaustive search attacks by increasing the size of any or all of the card enabler value, the terminal enabler value, and the terminal challenge value.

Figure 17:
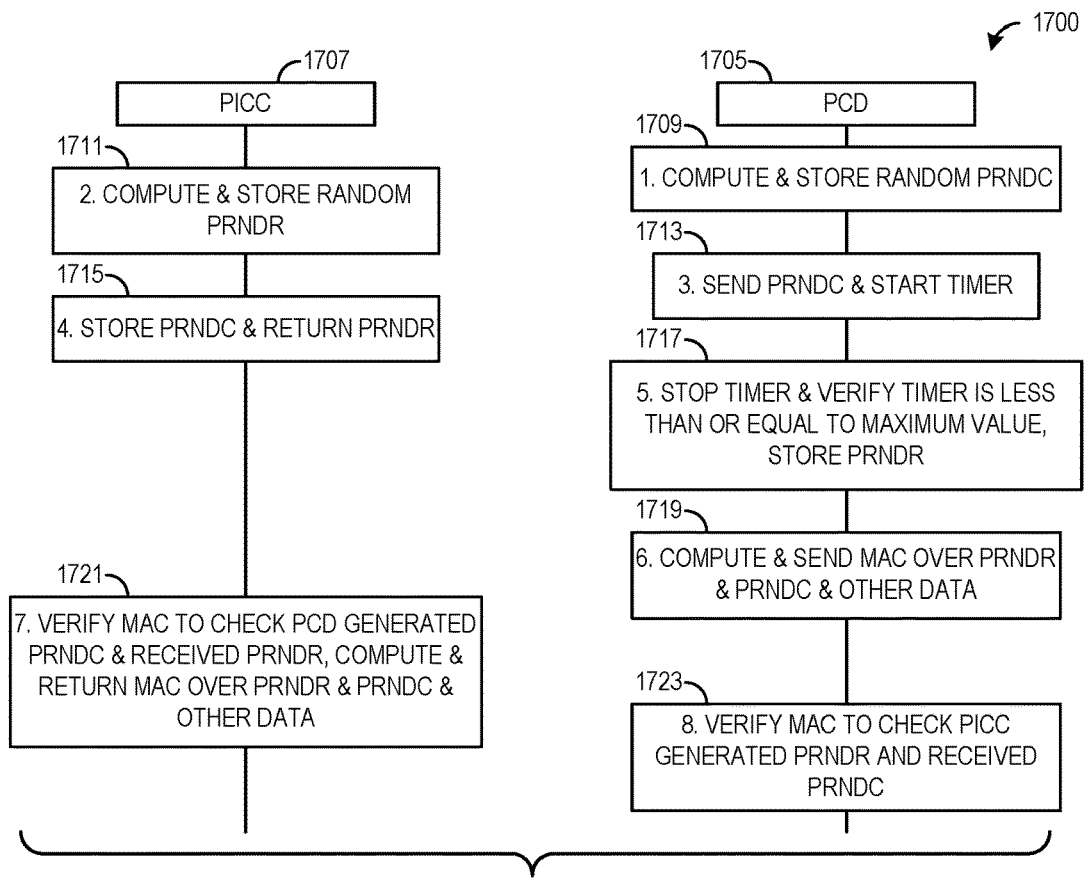
FIG. 17 illustrates a diagram of example operations occurring in a wireless smart key system compliant with the International Organization for Standardization/International Electrotechnical Commission (ISO/IEC) 14443 Type A contactless smart card standard, where the wireless smart key system is enhanced to validate the authenticity and proximity of the access card according to example embodiments presented herein.

FIG. 17 illustrates a diagram 1700 of example operations occurring in a wireless smart key system compliant to a commercially available extension of the International Organization for Standardization/International Electrotechnical Commission (ISO/IEC) 14443 Type A contactless smart card standard.

A proximity coupling device (PCD) 1705 computes and stores a randomly generated value PRNDC (event 1709). The PRNDC may be analogous to the terminal enabler value discussed previously. Similarly, a proximity integrated circuit card (PICC) 1707 computes and stores a randomly generated value PRNDR (event 1711). The PRNDR may be analogous to the card enabler value discussed previously. PCD 1705 sends the PRNDC to PICC 1707 and starts a timer (event 1713). PICC 1707 stores the PRNDC and sends the PRNDR to PCD 1705 (event 1715). PCD 1705 receives the PRNDR, stores the PRNDR, stops the timer, and verifies that the value of the timer is less than or equal to a maximum time threshold (event 1717). Events 1713, 1715, and 1717 are referred to as a proximity check (PC) command and are analogous to the relay attack check discussed above.

PCD 1705 computes and generates a message authentication code (MAC) and sends the MAC to PICC 1707 (event 1719). The MAC covers the PRNDC, the PRNDR, and other data. PICC 1707 verifies the MAC to verify the PRNDC generated by PCD 1705 and the PRNDR (event 1721). PICC 1707 also computes and returns a MAC that covers the PRNDR, the PRNDC, and other data (event 1721). PCD 1705 verifies the MAC to verify the PRNDR generated by PICC 1707 and the PRNDC (event 1723). Events 1719, 1721, and 1723 are referred to as a verify proximity check (VPC) command and are analogous to the general authentication discussed above.

In an embodiment, the PRNDC may be split into up to 7 PC commands. In such a situation, the MAC may be determined in accordance with the VPC, PPSE (other data), PRNDR1, PRNDC1, . . . , PRNDR7, PRNDC7, where PRNDRx and PRNDCx are the x-th portion of the PRNDR and PRNDC values.

In an embodiment, the techniques presented herein may be combined with other wireless smart key systems to enhance the security of the smart key systems without changing the standard ISO/IEC 14443 Type A contactless smart card standard.

Figure 18:
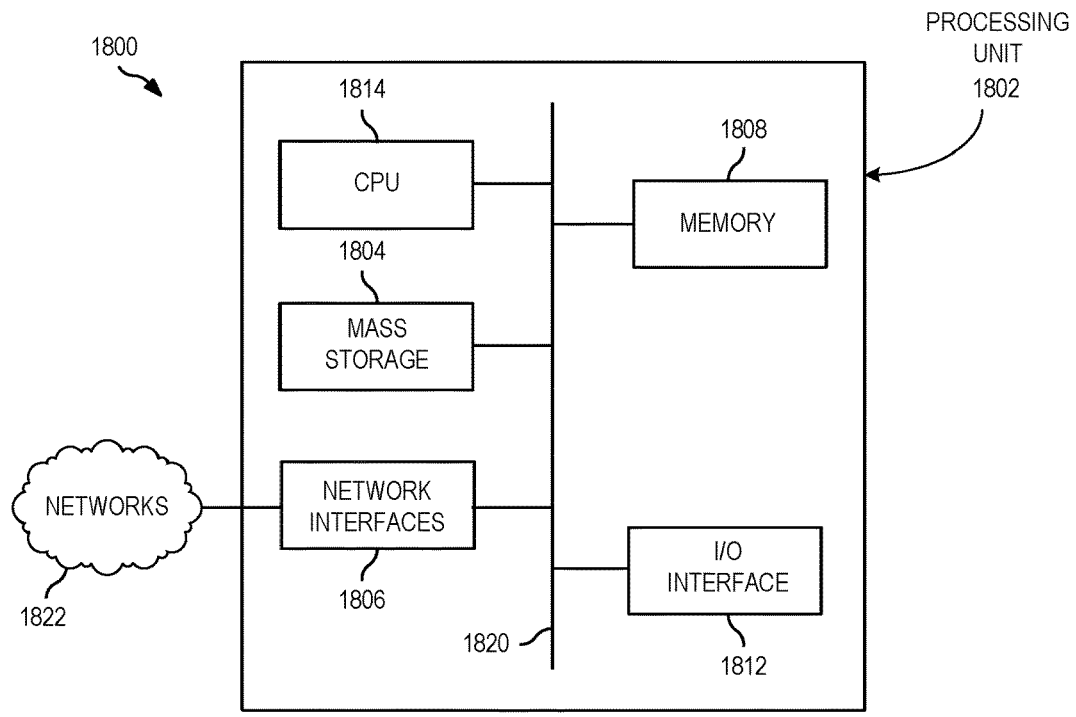
FIG. 18 is a block diagram of a computing system that may be used for implementing the devices and methods disclosed herein.

FIG. 18 is a block diagram of a computing system 1800 that may be used for implementing the devices and methods disclosed herein. For example, the computing system can be any entity of a module or an access card. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1800 includes a processing unit 1802. The processing unit includes a central processing unit (CPU) 1814, memory 1808, and may further include a mass storage device 1804, and an I/O interface 1812 connected to a bus 1820.

The bus 1820 may be one or more of any type of several bus architectures including a memory bus or memory controller, a peripheral bus, or a video bus. The CPU 1814 may comprise any type of electronic data processor. The memory 1808 may comprise any type of non-transitory system memory such as static random access memory (SRAM), dynamic random access memory (DRAM), synchronous DRAM (SDRAM), read-only memory (ROM), or a combination thereof. In an embodiment, the memory 1808 may include ROM for use at boot-up, and DRAM for program and data storage for use while executing programs.

The mass storage 1804 may comprise any type of non-transitory storage device configured to store data, programs, and other information and to make the data, programs, and other information accessible via the bus 1820. The mass storage 1804 may comprise, for example, one or more of a solid state drive, hard disk drive, a magnetic disk drive, or an optical disk drive.

The processing unit 1802 also includes one or more network interfaces 1806, which may comprise wired links, such as an Ethernet cable, or wireless links (e.g., NFC) to access nodes or different networks. The network interfaces 1806 allow the processing unit 1802 to communicate with remote units via the networks. For example, the network interfaces 1806 may provide wireless communication via one or more transmitters/transmit antennas and one or more receivers/receive antennas. In an embodiment, the processing unit 1802 is coupled to a local-area network 1822 or a wide-area network for data processing and communications with remote devices, such as other processing units, the Internet, or remote storage facilities.

Example embodiments of the invention are summarized here. Other embodiments can also be understood from the entirety of the specification as well as the claims filed herein.

Example 1. A method implemented by a terminal, the method including: performing, by the terminal and an access card, a first proximity check for the access card, the first proximity check sharing a local value associated with the terminal and a remote value associated with the access card; determining, by the terminal, that the access card has passed the first proximity check, and based thereon, performing, by the terminal with the access card, an authentication check of the access card in accordance with the local value associated with the terminal, the remote value associated with the access card, and a local challenge value associated with the terminal; and determining, by the terminal, that the access card has passed the first proximity check and the authentication check, and based thereon, validating, by the terminal, an authenticity and proximity of the access card.

Example 2. The method of example 1, where the local value associated with the terminal includes a value associated with the terminal that is generated by the terminal, and where the remote value associated with the access card includes a value associated with the access card that is received in a message from the access card.

Example 3. The method of one of examples 1 or 2, where performing the first proximity check includes: starting, by the terminal, a timer; sending, by the terminal to the access card, a first message including the local value associated with the terminal; receiving, by the terminal from the access card, a second message including the remote value associated with the access card; and stopping, by the terminal, the timer.

Example 4. The method of one of examples 1 to 3, where determining that the access card has passed the first proximity check includes: comparing, by the terminal, a value of the timer with a specified maximum value; and determining, by the terminal, that the access card has passed the first proximity check if the value is less than or equal to the specified maximum value.

Example 5. The method of one of examples 1 to 4, where performing the authentication check includes: sending, by the terminal to the access card, a first message including the local challenge value associated with the terminal; receiving, by the terminal from the access card, a second message including a signature generated in accordance with a first key of the access card, a remote value associated with the terminal, a local value associated with the access card, and a remote challenge value associated with the terminal; and verifying, by the terminal, the signature in accordance with a second key of the access card, the local value associated with the terminal, the remote value associated with the access card, and the local challenge value associated with the terminal.

Example 6. The method of one of examples 1 to 5, where the first key includes a private key and the second key includes a public key.

Example 7. The method of one of examples 1 to 6, where the remote value associated with the terminal includes a value associated with the terminal that is received by the access card in a message, where the remote value associated with the access card includes a value associated with the access card that is received in a message from the access card, and where the remote challenge value associated with the terminal includes a challenge value associated with the terminal that is received by the access card.

Example 8. The method of one of examples 1 to 7, where determining that the access card has passed the authentication check includes: determining, by the terminal, that the access card has passed the authentication check if the verification that the signature covers the local value associated with the terminal, the remote value associated with the access card, and the local challenge value associated with the terminal.

Example 9. The method of one of examples 1 to 8, further including performing, by the terminal with the access card, a second proximity check for the access card in accordance with the local value associated with the terminal and the local value associated with the access card.

Example 10. The method of one of examples 1 to 9, where determining that the access card has passed the first proximity check further including that the access card has passed the second proximity check.

Example 11. A terminal including: one or more processors; and a non-transitory memory storage including instructions that, when executed by the one or more processors, cause the terminal to: perform, with an access card, a proximity check for the access card in accordance with a local value associated with the terminal and a local value associated with the access card; and determine that the access card has passed the proximity check, and based thereon, perform, with the access card, an authentication check of the access card in accordance with the local value associated with the terminal, the local value associated with the access card, and a local challenge value associated with the terminal; and determine that the access card has passed the proximity check and the authentication check, and based thereon, validate the access card.

Example 12. The terminal of example 11, where the instructions further cause the terminal to: start a timer; send, to the access card, a first message including the local value associated with the terminal; receive, from the access card, a second message including the local value associated with the access card; and stop the timer, where the local value associated with the terminal includes a value associated with the terminal that is generated by the terminal, and where the local value associated with the access card includes a value associated with the access card that is received in a message from the access card.

Example 13. The terminal of one of examples 11 or 12, where the instructions further cause the terminal to: compare a value of the timer with a specified maximum value; and determine that the access card has passed the proximity check if the value is less than or equal to the specified maximum value.

Example 14. The terminal of one of examples 11 to 13, where the instructions further cause the terminal to: send, to the access card, a first message including a local challenge value associated with the terminal; receive, from the access card, a second message including a signature generated in accordance with a first key of the access card, a remote value associated with the terminal, a local value associated with the access card, and a remote challenge value associated with the terminal; and verify the signature in accordance with a second key of the access card, the local value associated with the terminal, the remote value associated with the access card, and the local challenge value associated with the terminal, where the remote value associated with the terminal includes a value associated with the terminal that is received by the access card in a message, where the remote value associated with the access card includes a value associated with the access card that is received in a message from the access card, and where the remote challenge value associated with the terminal includes a challenge value associated with the terminal that is received by the access card.

Example 15. The terminal of one of examples 11 to 14, where the instructions further cause the terminal to: determine that the access card has passed the authentication check if the verification that the signature covers the local value associated with the terminal, the remote value associated with the access card, and the local challenge value associated with the terminal.

Example 16. The terminal of one of examples 11 to 15, where the terminal includes a near field communications (NFC) terminal, and where the access card includes a NFC access card or a secure element.

Example 17. A method implemented by an access card, the method including: performing, by the access card and a terminal, a proximity check for the access card, the proximity check sharing a remote value associated with the terminal and a local value associated with the access card; and performing, by the access card and the terminal, an authentication check of the access card in accordance with the remote value associated with the terminal, the local value associated with the access card, and a remote challenge value associated with the terminal.

Example 18. The method of example 17, where performing the proximity check for the access card includes: generating, by the access card, the local value associated with the access card; receiving, by the access card from the terminal, a command message including the remote value associated with the terminal; and sending, by the access card to the terminal, a response message including the local value associated with the access card.

Example 19. The method of one of examples 17 or 18, where performing the authentication check of the access card includes: receiving, by the access card from the terminal, a command message including the remote challenge value associated with the terminal; generating, by the access card, a signature in accordance with a key of the access card, the remote value associated with the terminal, the local value associated with the access card, and the remote challenge value associated with the terminal; and sending, by the access card to the terminal, a response message including the signature.

Example 20. The method of one of examples 17 to 19, where the key includes a private key of the access card.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:
    transmitting, by a proximity coupling device to a proximity integrated circuit card, a terminal enabler value that is a unique randomly generated value associated with the proximity coupling device, the transmitting comprising transmitting the terminal enabler value in first portions;
    receiving, by the proximity coupling device from the proximity integrated circuit card, a remote enabler value that is a unique randomly generated value associated with the proximity integrated circuit card, the receiving comprising receiving the remote enabler value in second portions; and
    detecting a relay attack in response to a duration between transmitting the terminal enabler value in first portions and receiving the remote enabler value in second portions being greater than a maximum time threshold.

2. The method of claim 1, further comprising:
    transmitting, by the proximity coupling device to the proximity integrated circuit card, a first authentication message comprising a local challenge value associated with the proximity coupling device;
    receiving, by the proximity coupling device from the proximity integrated circuit card, an enabler value of a device initiating the relay attack;
    receiving, by the proximity coupling device from the proximity integrated circuit card, a second authentication message; and
    detecting a relay attack in response to determining that a signature of the second authentication message is generated in accordance with the enabler value of the device initiating the relay attack, the terminal enabler value, and a remote challenge value associated with the proximity coupling device.

3. The method of claim 1, further comprising:
    transmitting, by the proximity coupling device to the proximity integrated circuit card, a first authentication message comprising a local challenge value associated with the proximity coupling device;
    receiving, by the proximity coupling device from the proximity integrated circuit card, an enabler value of a device initiating the relay attack;
    receiving, by the proximity coupling device from the proximity integrated circuit card, a second authentication message; and
    detecting a relay attack in response to determining that a signature of the second authentication message is generated in accordance with the enabler value of the device initiating the relay attack, the terminal enabler value, and a remote challenge value associated with the device initiating the relay attack.

4. The method of claim 1, further comprising:
transmitting, by the proximity coupling device to the proximity integrated circuit card, a first authentication message comprising a local challenge value associated with the proximity coupling device;
receiving, by the proximity coupling device from the proximity integrated circuit card, a second authentication message; and
detecting a relay attack in response to determining that a signature of the second authentication message is generated in accordance with the remote enabler value, the terminal enabler value, and a remote challenge value associated with a device initiating the relay attack.

5. The method of claim 1, wherein the proximity coupling device and the proximity integrated circuit card are part of a system for gaining access to an automobile system, the method further comprising denying access to the automobile system in response to detecting the relay attack.

6. The method of claim 1, further comprising:
receiving the remote enabler value from the proximity integrated circuit card; and
authenticating the proximity integrated circuit card in response to:
validating values associated with the terminal enabler value, the remote enabler value, and a local challenge value associated with a system comprising the proximity coupling device and the proximity integrated circuit card, and
a duration between transmitting the terminal enabler value and receiving the remote enabler value being less than or equal to a maximum time threshold.

7. The method of claim 6, further comprising:
transmitting, by the proximity coupling device to the proximity integrated circuit card, a first authentication message comprising the local challenge value;
receiving, by the proximity coupling device from the proximity integrated circuit card, a second authentication message comprising a signature generated in accordance with a first key of the proximity integrated circuit card, the remote enabler value, the terminal enabler value, and a remote challenge value associated with the system; and
verify the signature in accordance with a second key of the proximity integrated circuit card, the terminal enabler value, the remote enabler value, and the local challenge value.

8. A method, comprising:
transmitting, by a proximity coupling device to a proximity integrated circuit card, a terminal enabler value that is a unique randomly generated value associated with the proximity coupling device, the transmitting comprising transmitting the terminal enabler value in first portions;
receiving, by the proximity coupling device from the proximity integrated circuit card, a remote enabler value that is a unique randomly generated value associated with the proximity integrated circuit card, the receiving comprising receiving the remote enabler value in second portions; and
detecting a relay attack in response to a duration between transmitting the terminal enabler value and receiving the remote enabler value being less than or equal to a minimum time threshold.

9. The method of claim 8, further comprising:
transmitting, by the proximity coupling device to the proximity integrated circuit card, a first authentication message comprising a local challenge value associated with the proximity coupling device;
receiving, by the proximity coupling device from the proximity integrated circuit card, an enabler value of a device initiating the relay attack;
receiving, by the proximity coupling device from the proximity integrated circuit card, a second authentication message; and
detecting a relay attack in response to determining that a signature of the second authentication message is generated in accordance with the enabler value of the device initiating the relay attack, the terminal enabler value, and a remote challenge value associated with the proximity coupling device.

10. The method of claim 8, further comprising:
transmitting, by the proximity coupling device to the proximity integrated circuit card, a first authentication message comprising a local challenge value associated with the proximity coupling device;
receiving, by the proximity coupling device from the proximity integrated circuit card, a second authentication message; and
detecting a relay attack in response to determining that a signature of the second authentication message is generated in accordance with an enabler value of a device initiating the relay attack, the terminal enabler value, and a remote challenge value associated with the device initiating the relay attack.

11. The method of claim 8, further comprising:
transmitting, by the proximity coupling device to the proximity integrated circuit card, a first authentication message comprising a local challenge value associated with the proximity coupling device;
receiving, by the proximity coupling device from the proximity integrated circuit card, a second authentication message; and
detecting a relay attack in response to determining that a signature of the second authentication message is generated in accordance with the remote enabler value, the terminal enabler value, and a remote challenge value associated with a device initiating the relay attack.

12. The method of claim 8, wherein the proximity coupling device and the proximity integrated circuit card are part of a system for gaining access to an automobile system, the method further comprising denying access to the automobile system in response to detecting the relay attack.

13. The method of claim 8, further comprising:
receiving the remote enabler value from the proximity integrated circuit card; and
authenticating the proximity integrated circuit card in response to:
validating values associated with the terminal enabler value, the remote enabler value, and a local challenge value associated with a system comprising the proximity coupling device and the proximity integrated circuit card, and
a duration between transmitting the terminal enabler value and receiving the remote enabler value being less than or equal to a maximum time threshold.

14. The method of claim 13, further comprising:
transmitting, by the proximity coupling device to the proximity integrated circuit card, a first authentication message comprising the local challenge value;
receiving, by the proximity coupling device from the proximity integrated circuit card, a second authentication message comprising a signature generated in accordance with a first key of the proximity integrated circuit card, the remote enabler value, the terminal enabler value, and a remote challenge value associated with the system; and verify the signature in accordance with a second key of the proximity integrated circuit card, the terminal enabler value, the remote enabler value, and the local challenge value.

15. A system comprising a proximity coupling device and a proximity integrated circuit card, the proximity coupling device configured to:

transmit a terminal enabler value associated with the proximity coupling device to the proximity integrated circuit card, the transmitting comprising transmitting the terminal enabler value in first portions;

receive a remote enabler value from the proximity integrated circuit card, the receiving comprising receiving the remote enabler value in second portions; and authenticate the proximity integrated circuit card in response to:

valid values associated with the terminal enabler value, the remote enabler value, and a local challenge value associated with the system, and a duration between transmitting the terminal enabler value and receiving the remote enabler value being less than or equal to a maximum time threshold.

16. The system of claim 15, wherein the proximity integrated circuit card is configured to:

receive the terminal enabler value from the proximity coupling device; and transmit the remote enabler value to the proximity coupling device in response to receiving the terminal enabler value.

17. The system of claim 16, wherein each of the proximity coupling device and the proximity integrated circuit card is further configured to store the terminal enabler value.

18. The system of claim 16, wherein the terminal enabler value and the remote enabler value are unique randomly generated values associated with, respectively, the proximity coupling device and the proximity integrated circuit card.

19. The system of claim 15, wherein the proximity coupling device is further configured to:

begin a timer in response to the terminal enabler value being transmitted; and stop the timer in response to receiving the remote enabler value, wherein the duration between the transmitting the terminal enabler value and the remote enabler value is determined using the timer.

20. The system of claim 15, wherein the proximity coupling device is further configured to:

transmit a first authentication message to the proximity integrated circuit card, the first authentication message comprising the local challenge value;

receive a second authentication message from the proximity integrated circuit card, the second authentication message comprising a signature generated in accordance with a first key of the proximity integrated circuit card, the remote enabler value, the terminal enabler value, and a remote challenge value associated with the system; and verify the signature in accordance with a second key of the proximity integrated circuit card, the terminal enabler value, the remote enabler value, and the local challenge value.

* * * * *